(12) United States Patent
Zhang et al.

(10) Patent No.: US 12,177,763 B2
(45) Date of Patent: *Dec. 24, 2024

(54) RADIO ACCESS CONTROL METHOD, APPARATUS, AND SYSTEM

(71) Applicant: HUAWEI TECHNOLOGIES CO., LTD., Guangdong (CN)

(72) Inventors: Tao Zhang, Shenzhen (CN); Yan Wang, Beijing (CN); Yinghui Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,565

(22) Filed: Aug. 14, 2023

(65) Prior Publication Data
US 2023/0403629 A1    Dec. 14, 2023

Related U.S. Application Data

(63) Continuation of application No. 17/371,276, filed on Jul. 9, 2021, now Pat. No. 11,751,121, which is a
(Continued)

(51) Int. Cl.
*H04W 48/02*    (2009.01)
*H04W 48/06*    (2009.01)
*H04W 76/10*    (2018.01)

(52) U.S. Cl.
CPC ........... *H04W 48/02* (2013.01); *H04W 48/06* (2013.01); *H04W 76/10* (2018.02)

(58) Field of Classification Search
CPC ...... H04W 48/02; H04W 48/06; H04W 76/10
See application file for complete search history.

(56) References Cited

U.S. PATENT DOCUMENTS

| 8,838,089 B2 | 9/2014 | Wu |
| 10,271,372 B2 | 4/2019 | Kim et al. |

(Continued)

FOREIGN PATENT DOCUMENTS

| CN | 101925153 A | 12/2010 |
| CN | 102238629 A | 11/2011 |

(Continued)

OTHER PUBLICATIONS

3GPP TS 36.300 V13.2.0 (Dec. 2015) 3rd Generation Partnership Project; Technical Specification Group Radio Access Network;Evolved Universal Terrestrial Radio Access (E-UTRA) and Evolved Universal Terrestrial Radio Access Network (E-UTRAN); Overall description;Stage 2(Release 13), dated 2015, total 290 pages.

(Continued)

*Primary Examiner* — Deepa Belur

(57) ABSTRACT

A radio access control method is provided. The method includes a terminal device receiving access control information sent by an access network device, the access control information indicating a barred service type and a barred data transmission attribute to the terminal device. The terminal device determines whether to send a radio resource control connection request to the access network device based on the barred service type and the barred data transmission attribute. The data transmission attribute comprises a transmission scheme type, and the transmission scheme type is used to indicate a transmission scheme used by the terminal device for transmitting service data used by the terminal device, thereby improving network resource utilization.

16 Claims, 17 Drawing Sheets

Related U.S. Application Data continuation of application No. 16/145,767, filed on Sep. 28, 2018, now Pat. No. 11,064,421, which is a continuation of application No. PCT/CN2016/078181, filed on Mar. 31, 2016.

(56) References Cited

U.S. PATENT DOCUMENTS

| | | | |
|---|---|---|---|
| 10,887,730 | B2 | 1/2021 | Yun et al. |
| 2011/0302310 | A1* | 12/2011 | Diachina ............... H04W 4/70 709/225 |
| 2012/0165058 | A1 | 6/2012 | Hwang et al. |
| 2014/0010180 | A1 | 1/2014 | Lee et al. |
| 2014/0128029 | A1 | 5/2014 | Fong et al. |
| 2014/0148165 | A1 | 5/2014 | Serravalle et al. |
| 2014/0206373 | A1 | 7/2014 | Ljung |
| 2014/0293964 | A1 | 10/2014 | Park et al. |
| 2015/0071064 | A1 | 3/2015 | Geng et al. |
| 2015/0215216 | A1 | 7/2015 | Ekici et al. |
| 2015/0230199 | A1 | 8/2015 | Jeong et al. |
| 2016/0205630 | A1 | 7/2016 | Chen et al. |
| 2016/0219493 | A1 | 7/2016 | Kim et al. |
| 2016/0255554 | A1 | 9/2016 | Ke et al. |
| 2017/0013501 | A1 | 1/2017 | Kim et al. |
| 2017/0041854 | A1 | 2/2017 | Kim et al. |
| 2018/0139671 | A1 | 5/2018 | Velev et al. |
| 2019/0028961 | A1 | 1/2019 | Faccin et al. |
| 2019/0159108 | A1* | 5/2019 | Lee ....................... H04W 48/10 |
| 2019/0268827 | A1* | 8/2019 | Kim ....................... H04W 48/08 |
| 2019/0320485 | A1* | 10/2019 | Kim ....................... H04W 76/25 |
| 2020/0314943 | A1 | 10/2020 | Kim et al. |
| 2021/0392574 | A1 | 12/2021 | Tiwari et al. |

FOREIGN PATENT DOCUMENTS

| | | |
|---|---|---|
| CN | 102387495 A | 3/2012 |
| CN | 102413497 A | 4/2012 |
| CN | 102469520 A | 5/2012 |
| CN | 102761933 A | 10/2012 |
| CN | 102761981 A | 10/2012 |
| CN | 102811462 A | 12/2012 |
| CN | 103220750 A | 7/2013 |
| CN | 103228025 A | 7/2013 |
| CN | 103299679 A | 9/2013 |
| CN | 103747481 A | 4/2014 |
| CN | 104902539 A | 9/2015 |
| CN | 105165103 A | 12/2015 |
| JP | 2014510496 A | 4/2014 |
| WO | 2011151747 A1 | 12/2011 |
| WO | 2015066383 A1 | 5/2015 |
| WO | 2016003140 A1 | 1/2016 |
| WO | 2016018012 A1 | 2/2016 |
| WO | 2017045708 A1 | 3/2017 |
| WO | WO-2017143915 A1 * | 8/2017 ............ H04W 28/20 |

OTHER PUBLICATIONS

3GPP TS 36.304 V13.1.0:"3rd Generation Partnership Project; Technical Specification Group Radio Access Network; Evolved Universal Terrestrial Radio Access (E-UTRA); User Equipment (UE) procedures in idle mode(Release 13)",Mar. 2016, total 42 pages.

3GPP TSG-RAN WG3 #91, R3-160399:"Indication of Bearer Type for cIOT ", Nokia Networks, Alcatel-Lucent, Alcatel-Lucent Shanghai Bell, St Julians, Malta, Feb. 15-19, 2016, total 22 pages.

Huawei, China Unicom Common impacts of NB-IoT solutions, 3GPP TSG-RAN3 Meeting #91 R3-160240, St. Julians, Malta, Feb. 15-19, 2015. total 3 pages.

Ericsson, Support for overload control [online], 3GPP TSG-SA WG2#113AH S2-161258, Feb. 23, 2016, 10 pages.

R3-102312 NEC,"Handling of MME Overload in a RN deployment",3GPP TSG-RAN WG3#69,Aug. 23-27, 2010, Madrid, Spain,total 4 pages.

R3-151103 Samsung,"RRC establishment rejection",3GPP TSG RAN WG3 #88,Fukuoka, Japan, May 25-29, 2015,total 4 pages.

3GPP TS 24.301 V13.5.0 (Mar. 2016),3rd Generation Partnership Project;Technical Specification Group Core Network and Terminals;Non-Access-Stratum (NAS) protocol for Evolved Packet System (EPS); Stage 3(Release 13),total 414 pages.

3GPP TS 36.331 V13.0.0 (Dec. 2015),3rd Generation Partnership Project;Technical Specification Group Radio Access Network;Evolved Universal Terrestrial Radio Access (E-UTRA);Radio Resource Control (RRC);Protocol specification (Release 13),dated Dec. 2015,total 507 pages.

3GPP TS 36.413 V13.2.0 (Mar. 2016),3rd Generation Partnership Project;Technical Specification Group Radio Access Network;Evolved Universal Terrestrial Radio Access Network(E-UTRAN);S1 Application Protocol (S1AP)(Release 13), total 321 pages.

R2-161306 Ericsson,"Access control for NB-IoT",3GPP TSG-RAN2 Meeting #93,St. Julian, Malta, Feb. 15 -19, 2016,total 5 pages.

* cited by examiner

RADIO ACCESS CONTROL METHOD, APPARATUS, AND SYSTEM

CROSS-REFERENCE TO RELATED APPLICATIONS

This application is a continuation of U.S. patent application Ser. No. 17/371,276, filed on Jul. 9, 2021, which is a continuation of U.S. patent application Ser. No. 16/145,767, filed on Sep. 28, 2018, now U.S. Pat. No. 11,064,421, which is a continuation of International Application No. PCT/CN2016/078181, filed on Mar. 31, 2016. All of the aforementioned patent applications are hereby incorporated by reference in their entireties.

TECHNICAL FIELD

Embodiments of the present disclosure relate to the communications field, and in particular, to a radio access control method, apparatus, and system.

BACKGROUND

A radio access technology (RAT) is a technology used when a terminal device accesses a mobile communications network. As communications technologies and the Internet of Things develop, the terminal device not only includes a first-type terminal device such as a smartphone and a tablet computer, but also includes a second-type terminal device such as a smart meter and a smart instrument.

Generally, a radio access technology used by the first-type terminal device is referred to as wideband evolved Universal Mobile Telecommunications System (UMTS) terrestrial radio access network (WB-E-UTRAN), and a radio access technology used by the second-type terminal device is referred to as cellular-based Narrowband Internet of Things (NB-IoT). Terminal devices use these two radio access technologies to access a same base station and a same mobility management entity (MME). After a terminal device uses the WB-E-UTRAN to access a base station for a service, a user plane (UP) scheme is used to transmit service data. A data transmission path of the UP transmission scheme is: terminal device->base station->serving gateway (SGW). After a terminal device uses the NB-IoT to access a base station for a service, a control plane (CP) scheme may be used to transmit service data in addition to the UP scheme. A data transmission path of the CP transmission scheme is: terminal device->base station->MME.

When load of the MME is relatively heavy, the MME sends an overload start message to the base station. The overload start message instructs the base station to allow the terminal device to establish RRC connections only for some types of services. However, for a type of service, when the UP scheme is used to transmit service data, the load of the MME is lighter; when the CP scheme is used to transmit service data, the load of the MME is heavier. When the MME instructs the base station to reject access of all services of a type, load impact caused by different data transmission attributes of the terminal device is not considered, leading to relatively low MME resource utilization.

SUMMARY

Embodiments of the present disclosure provide a radio access control method, apparatus, and system to resolve a problem of low MME utilization caused because an MME whose load is relatively heavy instructs a base station to reject access of all services of a type.

According to one embodiment, a radio access control method is provided, and the method includes: receiving, by a terminal device, access control information sent by an access network device, where the access control information indicates a barred service type and a barred data transmission attribute and/or an allowed service type and an allowed data transmission attribute to the terminal device; and determining, by the terminal device based on the service type and the data transmission attribute, whether to send a radio resource control (RRC) connection request to the access network device, where the data transmission attribute includes a transmission scheme type and/or a radio access technology (RAT) type, the transmission scheme type indicates a transmission scheme used by the terminal device for transmitting service data, and the RAT type indicates a radio access technology used by the terminal device.

For this embodiment, an MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: The access network device may bar and/or allow, based on the instruction of the MME, only access of a service that meets both the service type and the data transmission attribute, and service capabilities are provided for as many service types as possible without significantly increasing the load of the MME, thereby improving network resource utilization.

For one embodiment, the access control information includes an access control factor and an access control time period; and the determining, based on the service type and the data transmission attribute, whether to send an RRC connection request to the access network device includes: generating a random number when a service type of a current service meets the barred service type and a data transmission attribute corresponding to the current service meets the barred data transmission attribute; determining whether the random number is less than the access control factor; and when the random number is less than the access control factor, determining to send the RRC connection request to the access network device; or when the random number is greater than or equal to the access control factor, setting a timer based on the access control time period, and when the timer expires, re-executing the step of generating a random number.

For one embodiment, when the service type and the data transmission attribute meet the barred service type and the barred data transmission attribute, the terminal device generates the random number, compares the random number with the access control factor, and then determines whether to send the RRC connection request to the access network device, instead of directly giving up sending the RRC connection request. The access network device allows random access of the terminal device, instead of directly rejecting access of the terminal device. This achieves the following effect: service capabilities are provided for as many service types as possible without significantly increasing the load of the MME, thereby improving network resource utilization.

For one embodiment, the access control information includes an access barring class; and the determining, based on the service type and the data transmission attribute, whether to send an RRC connection request to the access network device includes: when a service type of a current service meets the barred service type and a data transmission attribute corresponding to the current service meets the barred data transmission attribute, detecting whether an access class of the terminal device is equal to the access barring class, and if the access class of the terminal device is not equal to the access barring class, determining to send the RRC connection request to the access network device; or when a service type of a current service meets the barred service type and a data transmission attribute corresponding to the current service meets the barred data transmission attribute, detecting whether an access class of the terminal device is greater than the access barring class, and if the access class of the terminal device is less than the access barring class, determining to send the RRC connection request to the access network device; or when a service type of a current service meets the barred service type and a data transmission attribute corresponding to the current service meets the barred data transmission attribute, detecting whether an access class of the terminal device is less than the access barring class, and if the access class of the terminal device is greater than the access barring class, determining to send the RRC connection request to the access network device.

For one embodiment, the access network device sends the access barring class to the terminal device. The terminal device determines, based on the access class of the terminal device and the access barring class, whether to send the RRC connection request. The terminal device sends the RRC connection request to the access network device for connection and service transmission only when the access class of the terminal device is not equal to or is not greater than or is not less than the access barring class. This achieves the following effect: a service is preferentially provided for a type of terminal device based on a service transmission requirement without significantly increasing the load of the MME.

For one embodiment, the determining, based on the service type and the data transmission attribute, whether to send an RRC connection request to the access network device includes: sending the RRC connection request to the access network device when a service type of a current service meets the allowed service type and a data transmission attribute corresponding to the current service meets the allowed data transmission attribute.

For one embodiment, the access control information includes a service type field and a data transmission attribute field, and the access control information has a default action type; or the access control information includes an action type field, a service type field, and a data transmission attribute field.

For one embodiment, the action type field includes at least one of access barred and access allowed; the service type field includes at least one of an emergency service, a high-priority service, a mobile terminated service, a mobile originated signaling service, a mobile originated data service, a delay tolerant service, a mobile originated voice service, and a mobile originated exception service; and when the data transmission attribute is the transmission scheme type, the data transmission attribute field includes at least one of a user plane scheme and a control plane scheme; or when the data transmission attribute is the RAT type, the data transmission attribute field includes at least one of the wideband evolved Universal Mobile Telecommunications System (UMTS) terrestrial radio access network (WB-E-UTRAN) and the cellular-based Narrowband Internet of Things (NB-IoT).

According to one embodiment, a radio access control method is provided, and the method includes: receiving, by an access network device, an overload start message sent by a mobility management entity (MME), where the overload start message indicates a barred service type and a barred data transmission attribute and/or an allowed service type and an allowed data transmission attribute to the access network device; generating, by the access network device, access control information based on the overload start message, where the access control information indicates the barred service type and the barred data transmission attribute and/or the allowed service type and the allowed data transmission attribute to a terminal device; and sending, by the access network device, the access control information to the terminal device, where the data transmission attribute includes a transmission scheme type and/or a RAT type, the transmission scheme type indicates a transmission scheme used by the terminal device for transmitting service data, and the RAT type indicates a radio access technology used by the terminal device.

In the embodiment, the MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: The access network device may bar and/or allow, based on the instruction of the MME, only access of a service that meets both the service type and the data transmission attribute, and service capabilities are provided for as many service types as possible without significantly increasing the load of the MME, thereby improving network resource utilization.

For one embodiment, the access control information includes an access control factor and an access control time period.

For one embodiment, the access control information includes an access barring class.

For one embodiment, the overload start message includes a service type field and a data transmission attribute field, and the overload start message has a default action type; or the overload start message includes an action type field, a service type field, and a data transmission attribute field.

For one embodiment, the action type field includes at least one of access barred and access allowed; the service type field includes at least one of an emergency service, a high-priority service, a mobile terminated service, a mobile originated signaling service, a mobile originated data service, a delay tolerant service, a mobile originated voice service, and a mobile originated exception service; and when the data transmission attribute is the transmission scheme type, the data transmission attribute field includes at least one of a user plane scheme and a control plane scheme; or when the data transmission attribute is the RAT type, the data transmission attribute field includes at least one of the WB-E-UTRAN and the NB-IoT.

According to one embodiment, a radio access control method is provided, and the method includes: sending, by a terminal device, an RRC connection request message to an access network device, where the RRC connection request has a corresponding service type and a corresponding data transmission attribute; and receiving, by the terminal device, an RRC connection setup message or an RRC connection reject message sent by the access network device, where the RRC connection setup message or the RRC connection reject message is sent by the access network device based on whether the service type and the data transmission attribute that are corresponding to the RRC connection request belong to a barred service type and a barred data transmission attribute and/or an allowed service type and an allowed data transmission attribute, where the data transmission attribute includes a transmission scheme type and/or a RAT type, the transmission scheme type indicates a transmission scheme used by the terminal device for transmitting service data, and the RAT type indicates a radio access technology used by the terminal device.

In the embodiment, an MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: The access network device may bar and/or allow, based on the instruction of the MME, only access of a service that meets both the service type and the data transmission attribute, and service capabilities are provided for as many service types as possible without significantly increasing the load of the MME, thereby improving network resource utilization.

For one embodiment, the RRC connection request message includes a service type field and a data transmission attribute field.

For one embodiment, the service type field includes at least one of an emergency service, a high-priority service, a mobile terminated service, a mobile originated signaling service, a mobile originated data service, a delay tolerant service, a mobile originated voice service, and a mobile originated exception service; and when the data transmission attribute is the transmission scheme type, the data transmission attribute field includes at least one of a user plane scheme and a control plane scheme; or when the data transmission attribute is the RAT type, the data transmission attribute field includes at least one of the WB-E-UTRAN and the NB-IoT.

For one embodiment, the method further includes: sending, by the terminal device, the data transmission attribute corresponding to the RRC connection request to the access network device, where the RRC connection request message includes a service type field.

According to one embodiment, a radio access control method is provided, and the method includes: receiving, by an access network device, an overload start message sent by an MME, where the overload start message indicates a barred service type and a barred data transmission attribute and/or an allowed service type and an allowed data transmission attribute to the access network device; receiving, by the access network device, an RRC connection request message sent by a terminal device, where the RRC connection request has a corresponding service type and a corresponding data transmission attribute; and sending, by the access network device, an RRC connection setup message or an RRC connection reject message to the terminal device based on whether the service type and the data transmission attribute that are corresponding to the RRC connection request belong to the barred service type and the barred data transmission attribute and/or the allowed service type and the allowed data transmission attribute, where the data transmission attribute includes a transmission scheme type and/or a RAT type, the transmission scheme type indicates a transmission scheme used by the terminal device for transmitting service data, and the RAT type indicates a radio access technology used by the terminal device.

In the embodiment, the MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: the access network device may bar and/or allow, based on the instruction of the MME, only access of a service that meets both the service type and the data transmission attribute, and service capabilities are provided for as many service types as possible without significantly increasing the load of the MME, thereby improving network resource utilization.

For one embodiment, the RRC connection request message includes a service type field and a data transmission attribute field.

For one embodiment, the service type field includes at least one of an emergency service, a high-priority service, a mobile terminated service, a mobile originated signaling service, a mobile originated data service, a delay tolerant service, a mobile originated voice service, and a mobile originated exception service; and when the data transmission attribute is the transmission scheme type, the data transmission attribute field includes at least one of a user plane scheme and a control plane scheme; or when the data transmission attribute is the RAT type, the data transmission attribute field includes at least one of the WB-E-UTRAN and the NB-IoT.

For one embodiment, the method further includes: receiving, by the access network device, the data transmission attribute that is corresponding to the RRC connection request and that is sent by the terminal device, where the RRC connection request message includes a service type field.

For one embodiment, the sending, by the access network device, an RRC connection setup message or an RRC connection reject message to the terminal device based on whether the service type and the data transmission attribute that are corresponding to the RRC connection request belong to the barred service type and the barred data transmission attribute and/or the allowed service type and the allowed data transmission attribute includes: sending the RRC connection setup message to the terminal device when the service type and the data transmission attribute that are corresponding to the RRC connection request are the allowed service type and the allowed data transmission attribute; or sending the RRC connection reject message to the terminal device when the service type and the data transmission attribute that are corresponding to the RRC connection request are the barred service type and the barred data transmission attribute.

According to one embodiment, a radio access control method is provided, and the method includes: sending, by an MME, an overload start message to an access network device when load is greater than a preset condition, where the overload start message indicates a barred service type and a barred data transmission attribute and/or an allowed service type and an allowed data transmission attribute to the access network device, the data transmission attribute includes a transmission scheme type and/or a RAT type, the transmission scheme type indicates a transmission scheme used by a terminal device for transmitting service data, and the RAT type indicates a radio access technology used by the terminal device.

In the embodiment, the MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: The access network device may bar and/or allow, based on the instruction of the MME, only access of a service that meets both the service type and the data transmission attribute, and service capabilities are provided for as many service types as possible without significantly increasing the load of the MME, thereby improving network resource utilization.

For one embodiment, the overload start message includes a service type field and a data transmission attribute field, and the overload start message has a default action type; or the overload start message includes an action type field, a service type field, and a data transmission attribute field.

For one embodiment, the action type field includes at least one of access barred and access allowed; the service type field includes at least one of an emergency service, a high-priority service, a mobile terminated service, a mobile originated signaling service, a mobile originated data service, a delay tolerant service, a mobile originated voice service, and a mobile originated exception service; and when the data transmission attribute is the transmission scheme type, the data transmission attribute field includes at least one of a user plane scheme and a control plane scheme; or when the data transmission attribute is the RAT type, the data transmission attribute field includes at least one of the WB-E-UTRAN and the NB-IoT.

According to one embodiment, a terminal device is provided. The terminal device has a function of implementing behavior of the terminal device in the radio access control method according to the first aspect and/or the third aspect. The function may be implemented by hardware, or may be implemented by hardware executing corresponding software. The hardware or the software includes one or more modules corresponding to the function.

For one embodiment, a structure of the terminal device includes a processor, a transmitter, and a receiver. The processor is configured to support the terminal device in executing a corresponding function in the foregoing method. The transmitter and the receiver are configured to: support communication between the terminal device and an access network device, send information or an instruction in the foregoing method to the access network device, and receive information or an instruction in the foregoing method that is sent by the access network device. The terminal device may further include a memory. The memory is configured to be coupled with the processor, and store a necessary program instruction and necessary data of the terminal device.

According to one embodiment, an access network device is provided. The access network device has a function of implementing behavior of the access network device in the radio access control method according to the second aspect and/or the fourth aspect. The function may be implemented by hardware, or may be implemented by hardware executing corresponding software. The hardware or the software includes one or more modules corresponding to the function.

For one embodiment, a structure of the access network device includes a processor, a transmitter, and a receiver. The processor is configured to support the access network device in executing a corresponding function in the foregoing method. The transmitter and the receiver are configured to: support communication between the access network device and a terminal device and/or an MME, send information or an instruction in the foregoing method to the terminal device and/or the MME, and receive information or an instruction in the foregoing method that is sent by the terminal device and/or the MME. The access network device may further include a memory. The memory is configured to be coupled with the processor, and store a necessary program instruction and necessary data of the access network device.

According to one embodiment, an MME is provided. The MME has a function of implementing behavior of the MME in the radio access control method according to the third aspect. The function may be implemented by hardware, or may be implemented by hardware executing corresponding software. The hardware or the software includes one or more modules corresponding to the function.

For one embodiment, a structure of the MME includes a processor, a transmitter, and a receiver. The processor is configured to support the MME in executing a corresponding function in the foregoing method. The transmitter and the receiver are configured to: support communication between the MME and an access network device, send information or an instruction in the foregoing method to the access network device, and receive information or an instruction in the foregoing method that is sent by the access network device. The MME may further include a memory. The memory is configured to be coupled with the processor, and store a necessary program instruction and necessary data of the MME.

According to one embodiment, a radio access control system is provided. The radio access control system includes the terminal device according to the sixth aspect, the access network device according to the seventh aspect, and the MME according to the eighth aspect.

DESCRIPTION OF EMBODIMENTS

A "module" mentioned in this specification is a program or an instruction that is stored in a memory and may implement some functions. A "unit" mentioned in this specification is a functional structure divided based on logic. The "unit" may be implemented by only hardware, or implemented by a combination of software and hardware.

In this specification, "a plurality of" refers to two or more than two. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

Figure 1:
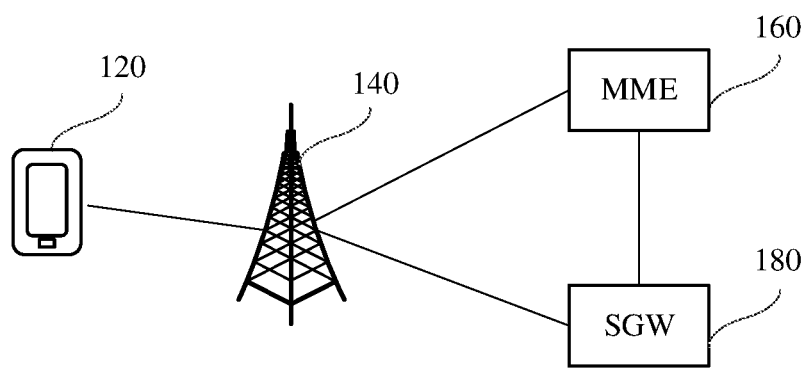
FIG. 1 is a diagram of a radio access control system according to an example embodiment.

Referring to FIG. 1, FIG. 1 is a structural diagram of a radio access control system according to an example embodiment of the present disclosure. The radio access control system includes a terminal device 120, an access network device 140, a mobility management entity (MME) 160, and a serving gateway (SGW) 180.

The terminal device 120 may be a first-type terminal device or a second-type terminal device. The first-type terminal device is an electronic device having a radio communication capability, such as a smartphone, a tablet computer, an e-book reader, and a portable computer. The second-type terminal device may be a smart instrument or a smart meter having a radio communication capability.

The terminal device 120 may use a radio access technology (RAT) to access a mobile communications network provided by the access network device 140. RAT types include but are not limited to wideband evolved Universal Mobile Telecommunications System (UMTS) terrestrial radio access network (WB-E-UTRAN), cellular-based Narrowband Internet of Things (NB-IoT), and the 5th generation mobile communications technology (5G).

When the terminal device 120 is a first-type terminal device, a RAT type used by the terminal device 120 may be the WB-E-UTRAN. An available frequency band of the WB-E-UTRAN is wider.

When the terminal device 120 is a second-type terminal device, a RAT type used by the terminal device 120 may be the NB-IoT. An available frequency band of the NB-IoT is narrower.

The access network device 140 is a network element interacting with the terminal device 120, and the access network device 130 may be a base station.

Optionally, the access network device 140 is a base station (BTS) in Global System for Mobile Communications (GSM) or Code Division Multiple Access (CDMA).

Optionally, the access network device 140 is a base station (NodeB) in UMTS.

Optionally, the access network device 140 is an evolved NodeB (eNB or e-NodeB) in Long Term Evolution (LTE).

Optionally, the access network device 140 is an access point (AP) in Wireless Fidelity (WI-FI).

The MME 160 is a network element corresponding to a control plane CP) in the radio access control system. The SGW 180 is a network element corresponding to a user plane (UP) in the radio access control system. The access network device 140 is separately connected to the MME 160 and the SGW 180 by using a wireless network or a wired network. The MME 160 is connected to the SGW 180 by using a wireless network or a wired network.

It should be noted that the radio access control system may include a plurality of terminal devices 120 and a plurality of access network devices 140. One access network device 140 may communicate with a plurality of terminal devices 120, and the plurality of terminal devices 120 that communicate with the access network device 140 may be first-type terminal devices or second-type terminal devices. In FIG. 1, only one terminal device 120 and one access network device 140 are shown for example description.

When the terminal device 120 is a first-type terminal device, and a service transmitted by the terminal device 120 is at least one of an emergency service (emergency), a high-priority service (highPriorityAccess), a mobile terminated service (mt-Access), a mobile originated signaling service (mo-Signaling), a mobile originated data service (mo-Data), a delay tolerant service (delayTolerantAccess), and a mobile originated voice service (mo-VoiceCall), the terminal device 120 uses the WB-E-UTRAN to send a radio resource control (RRC) connection request to the access network device 140, to request to establish an RRC connection with the access network device 140. After establishing the RRC connection with the access network device 140, the terminal device 120 establishes communication with the MME 160 by using the access network device 140, so that the terminal device 120 accesses the mobile communications network.

Figure 2:
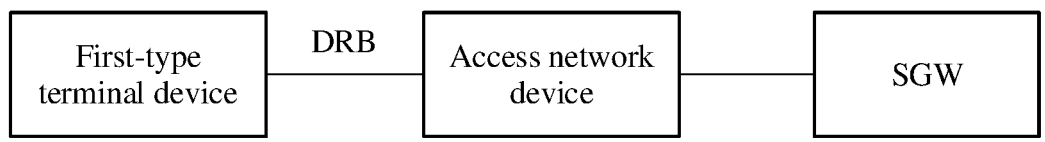
FIG. 2 is a diagram of service transmission according to an example embodiment.

After establishing the RRC connection with the access network device 140, the terminal device 120 uses the WB-E-UTRAN to transmit the service. A transmission scheme used by the terminal device 120 for transmitting the service is a user plane scheme: The first-type terminal device uses a data radio bearer (DRB) in the RRC connection to send service data of the service to the access network device 140, and then the access network device 140 sends the service data of the service to the SGW 180 to implement service transmission. When the terminal device 120 is a first-type terminal device, a transmission diagram in which the terminal device 120 transmits the service is shown in FIG. 2.

When the terminal device 120 is a second-type terminal device, and a service transmitted by the terminal device 120 is at least one of a mobile terminated service, a mobile originated signaling service, a mobile originated data service, and a mobile originated exception service (mo-ExceptionData), the terminal device 120 uses the NB-IoT to send an RRC connection request to the access network device 140, to request to establish an RRC connection with the access network device 140. After establishing the RRC connection with the access network device 140, the terminal device 120 establishes communication with the MME 160 by using the access network device 140, so that the terminal device 120 accesses the mobile communications network.

Figure 3:
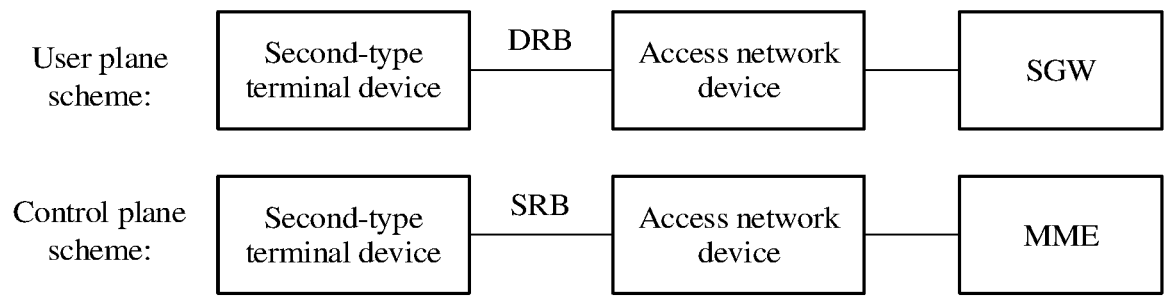
FIG. 3 is a diagram of service transmission according to an example embodiment.

After establishing the RRC connection with the access network device 140, the terminal device 120 uses the NB-IoT to transmit the service. A transmission scheme used by the terminal device 120 for transmitting the service is a user plane scheme or a control plane scheme. When the terminal device 120 uses the user plane scheme to transmit the service, the terminal device 120 uses a DRB to send service data of the service to the access network device 140, and then the access network device 140 sends the service data of the service to the SGW 180 to implement service transmission. When the terminal device 120 uses the control plane scheme to transmit the service, the terminal device 120 uses a signaling radio bearer (SRB) to send service data of the service to the access network device 140, and then the access network device 140 sends the service data of the service to the MME 160 to implement service transmission. When the terminal device 120 is a second-type terminal device, a transmission diagram in which the terminal device 120 transmits the service is shown in FIG. 3.

Figure 4:
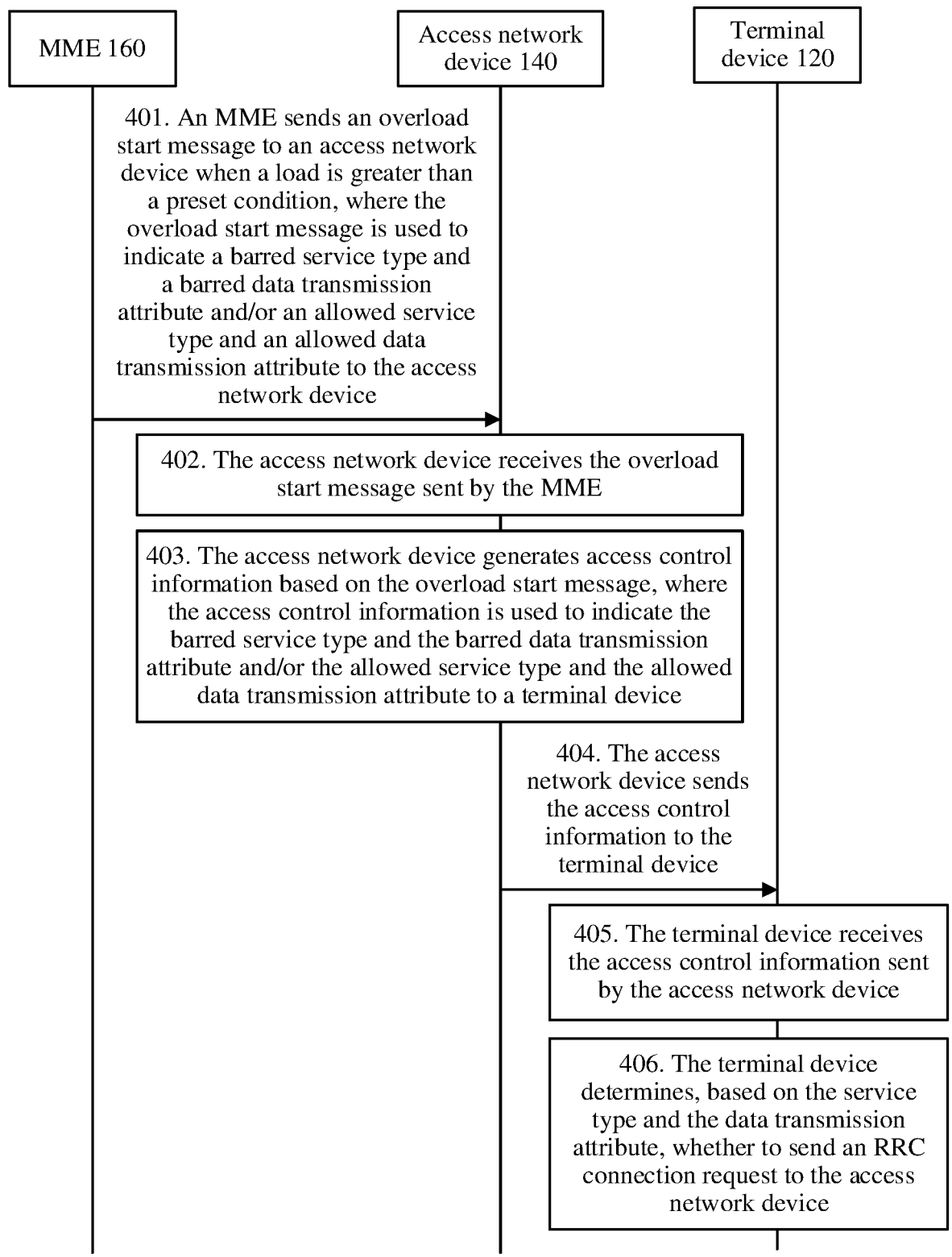
FIG. 4 is a flowchart of a radio access control method according to an example embodiment.

Referring to FIG. 4, FIG. 4 is a flowchart of a radio access control method according to an example embodiment of the present disclosure. This embodiment is described by using an example in which the method is applied to the radio access control system shown in FIG. 1. The method includes the following steps.

Step 401: An MME sends an overload start message to an access network device when load is greater than a preset condition, where the overload start message indicates a barred service type and a barred data transmission attribute and/or an allowed service type and an allowed data transmission attribute to the access network device.

The data transmission attribute includes a transmission scheme type and/or a RAT type. The transmission scheme type indicates a transmission scheme used by a terminal device for transmitting service data. The RAT type indicates a radio access technology used by the terminal device.

Step 402: The access network device receives the overload start message sent by the MME.

Step 403: The access network device generates access control information based on the overload start message, where the access control information indicates the barred service type and the barred data transmission attribute and/or the allowed service type and the allowed data transmission attribute to a terminal device.

Step 404: The access network device sends the access control information to the terminal device.

Step 405: The terminal device receives the access control information sent by the access network device.

Step 406: The terminal device determines, based on the service type and the data transmission attribute, whether to send an RRC connection request to the access network device.

Step 401 may be independently implemented as a radio access control method on an MME side. Step 402, step 403, and step 404 may be independently implemented as a radio access control method on an access network device side. Step 405 and step 406 may be independently implemented as a radio access control method on a terminal device side.

In view of the above, according to the radio access control method provided in this embodiment of this disclosure, the MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: the access network device may bar and/or allow, based on the instruction of the MME, only access of a service that meets both the service type and the data transmission attribute, and service capabilities are provided for as many service types as possible without significantly increasing the load of the MME, thereby improving network resource utilization.

Figure 5A:
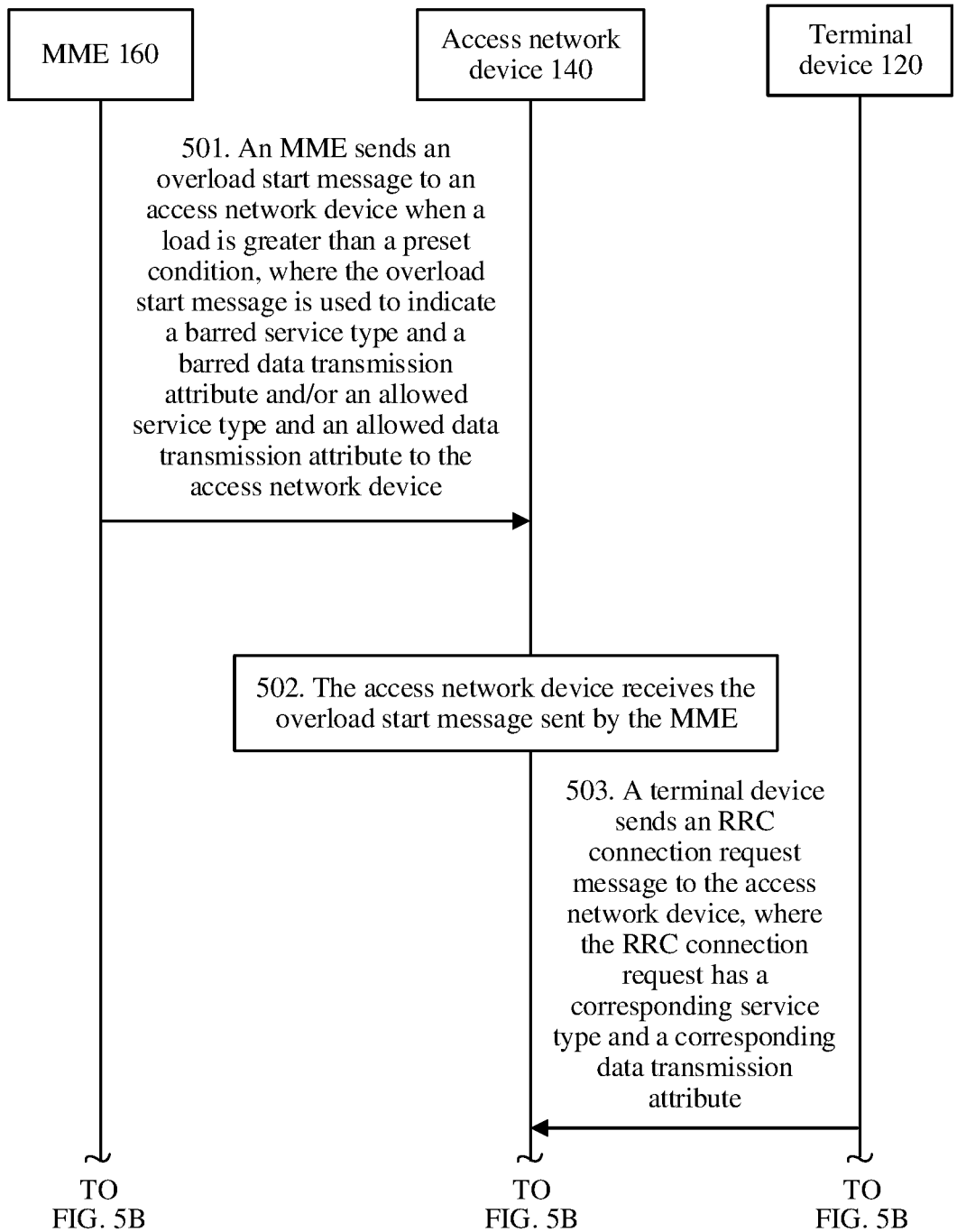
FIG. 5A and FIG. 5B are a flowchart of a radio access control method according to an example embodiment.
Figure 5B:
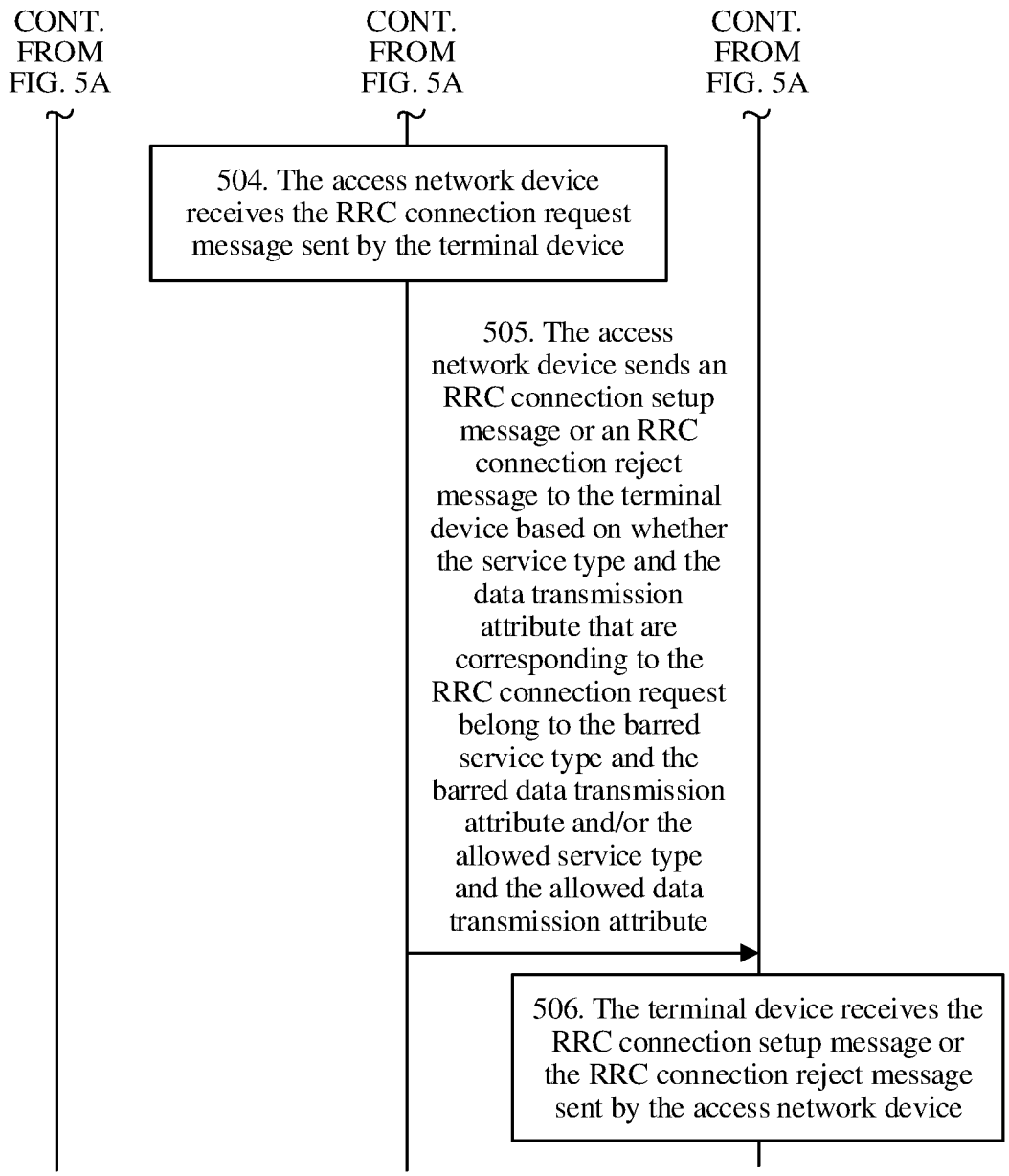

Referring to FIG. 5A and FIG. 5B, FIG. 5A and FIG. 5B are a flowchart of a radio access control method according to another example embodiment of the present disclosure. This embodiment is described by using an example in which the method is applied to the radio access control system shown in FIG. 1. The method includes the following steps.

Step 501: An MME sends an overload start message to an access network device when load is greater than a preset condition, where the overload start message indicates a barred service type and a barred data transmission attribute and/or an allowed service type and an allowed data transmission attribute to the access network device.

The data transmission attribute includes a transmission scheme type and/or a RAT type. The transmission scheme type indicates a transmission scheme used by a terminal device for transmitting service data. The RAT type indicates a radio access technology used by the terminal device.

Step 502: The access network device receives the overload start message sent by the MME.

Step 503: A terminal device sends an RRC connection request message to the access network device, where the RRC connection request has a corresponding service type and a corresponding data transmission attribute.

Step 504: The access network device receives the RRC connection request message sent by the terminal device.

Step 505: The access network device sends an RRC connection setup message or an RRC connection reject message to the terminal device based on whether the service type and the data transmission attribute that are corresponding to the RRC connection request belong to the barred service type and the barred data transmission attribute and/or the allowed service type and the allowed data transmission attribute.

Step 506: The terminal device receives the RRC connection setup message or the RRC connection reject message sent by the access network device.

Step 501 may be independently implemented as a radio access control method on an MME side. Step 502, step 504, and step 505 may be independently implemented as a radio access control method on an access network device side. Step 503 and step 506 may be independently implemented as a radio access control method on a terminal device side.

In view of the above, according to the radio access control method provided in this embodiment of this disclosure, the MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: the access network device may bar and/or allow, based on the instruction of the MME, only access of a service that meets both the service type and the data transmission attribute, and service capabilities are provided for as many service types as possible without significantly increasing the load of the MME, thereby improving network resource utilization.

A data transmission attribute includes a transmission scheme type and/or a RAT type. The following embodiment is described by using an example in which the data transmission attribute is the transmission scheme type. In this case, a data transmission attribute field is a transmission scheme type field.

Figure 6A:
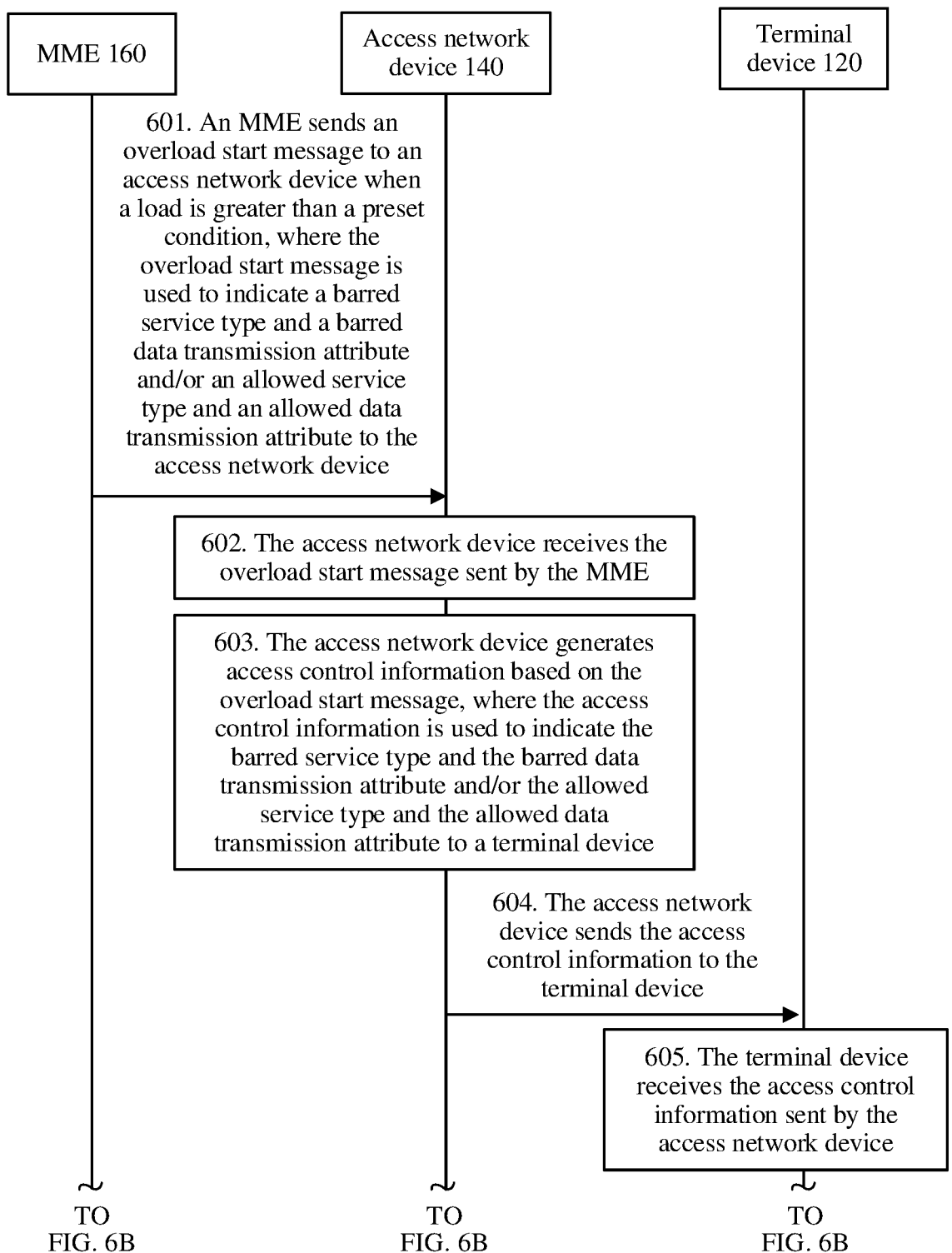
FIG. 6A and FIG. 6B are a flowchart of a radio access control method according to another example embodiment.
Figure 6B:
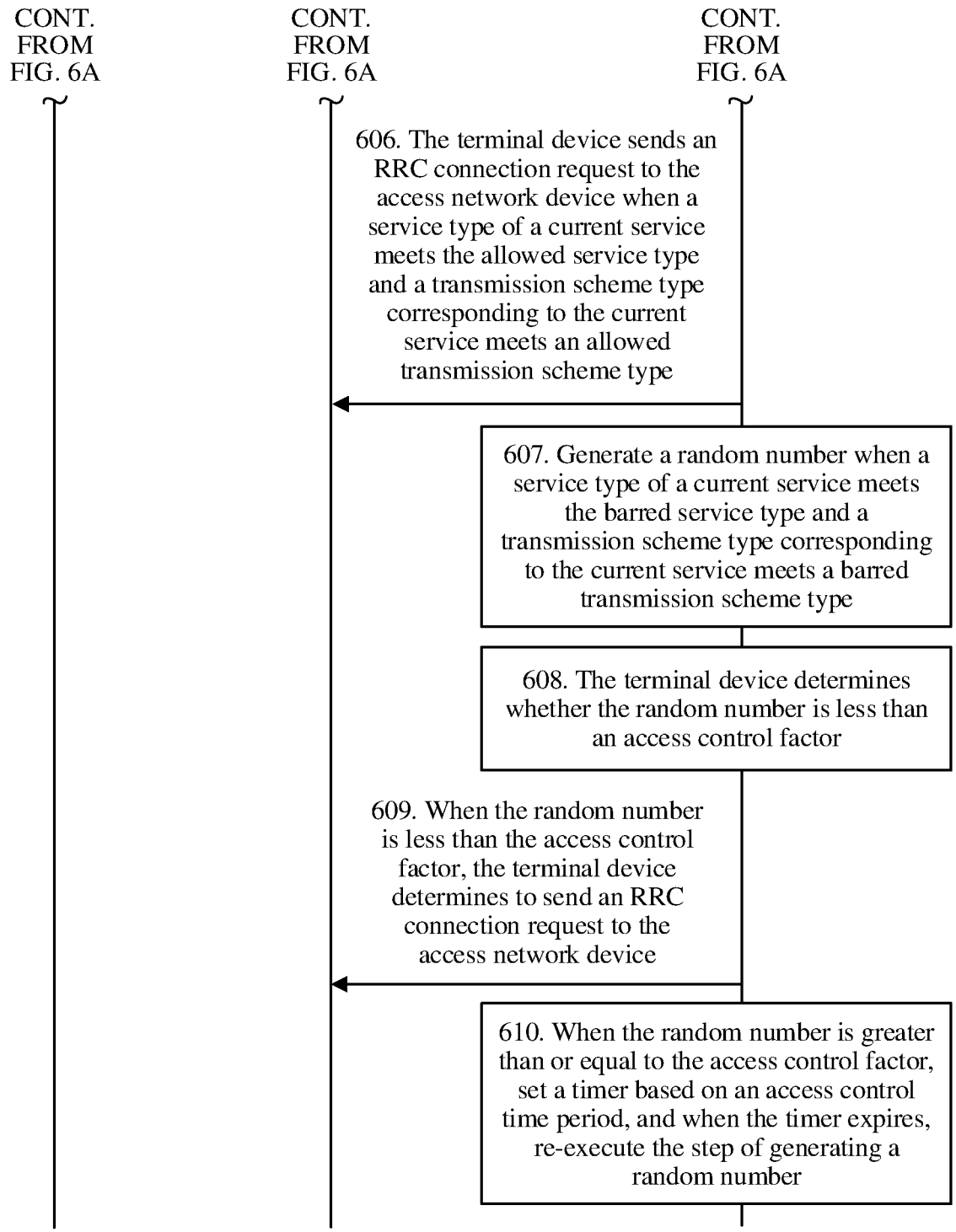

Referring to FIG. 6A and FIG. 6B, FIG. 6A and FIG. 6B are a flowchart of a radio access control method according to an example embodiment of the present disclosure. This embodiment is described by using an example in which the method is applied to the radio access control system shown in FIG. 1. The method includes the following steps.

Step 601: An MME sends an overload start message to an access network device when load is greater than a preset condition, where the overload start message indicates a barred service type and a barred transmission scheme type and/or an allowed service type and an allowed transmission scheme type to the access network device.

Two different implementations are available for the MME to send the overload start message to the access network device to indicate the barred service type and the barred transmission scheme type and/or the allowed service type and the allowed transmission scheme type. The overload start message includes different content in different implementations.

In a first implementation, the overload start message includes a service type field and a transmission scheme type field. The overload start message has a default action type. The action type is access barred or access allowed. Optionally, the default action type of the overload start message is preset.

For example, the default action type of the overload start message is access barred, and information carried in the overload start message is (mo-Data, CP), where mo-Data is the service type field, and CP is the transmission scheme type field. The overload start message indicates that a mo-Data service transmitted by using a CP scheme is barred.

In a second implementation, the overload start message includes an action type field, a service type field, and a transmission scheme type field. The action type field indicates an action type of the overload start message, and the action type field includes at least one of access barred and access allowed.

For example, information carried in the overload start message is (allowed, mo-Data, UP), where allowed is the action type field, mo-Data is the service type field, and UP is the transmission scheme type field. The overload start message indicates that a mo-Data service transmitted by using a UP scheme is allowed.

A form and content of the overload start message are not limited in this embodiment.

In the two implementations, the service type field indicates a service type, and the service type field includes at least one of an emergency service, a high-priority service, a mobile terminated service, a mobile originated signaling service, a mobile originated data service, a delay tolerant service, a mobile originated voice service, and a mobile originated exception service.

The transmission scheme type field indicates a transmission scheme used for a service, and the transmission scheme type field includes at least one of a user plane scheme and a control plane scheme.

Optionally, the "preset condition" in that the load is greater than the preset condition is a preset value in the system or a condition defined by operation and maintenance personnel, and this is not limited in this embodiment.

Optionally, when the MME needs to indicate a plurality of action types and/or service types and/or transmission scheme types to the access network device, the MME may perform centralized indication in one overload start message sent to the access network device, or perform separate indication in a plurality of overload start messages sent to the access network device. This is not limited in this embodiment.

For example, when the MME needs to indicate, to the access network device, that a mo-Data service transmitted by using the CP scheme is barred, and that a mo-ExceptionData service transmitted by using the CP scheme is barred, the MME may perform centralized indication in a same overload start message, for example ((mo-Data, CP), (mo-ExceptionData, CP)), and the default action type of the overload start message is access barred. Alternatively, the MME may perform separate indication in a plurality of overload start messages. One overload start message is (barred, mo-Data, CP), and the other overload start message is (barred, mo-ExceptionData, CP).

Step 602: The access network device receives the overload start message sent by the MME.

When the overload start message includes the service type field and the transmission scheme type field, and the overload start message has the default action type, the access network device determines the default action type of the overload start message, obtains a service type by parsing the service type field, and obtains a transmission scheme type by parsing the transmission scheme type field.

When the overload start message includes the action type field, the service type field, and the transmission scheme type field, the access network device obtains an action type by parsing the action type field, obtains a service type by parsing the service type field, and obtains a transmission scheme type by parsing the transmission scheme type field.

Step 603: The access network device generates access control information based on the overload start message, where the access control information indicates the barred service type and the barred data transmission attribute and/or the allowed service type and the allowed transmission scheme type to a terminal device.

An action type indicated by the access control information is the same as the action type that is of the overload start message and that is determined by the access network device.

A service type indicated by the access control information is the same as the service type obtained by the access network device by parsing the service type field in the overload start message. A transmission scheme type indicated by the access control information is the same as the transmission scheme type obtained by the access network device by parsing the data transmission attribute field in the overload start message.

Two different implementations are available for the access network device to indicate the barred service type and the barred transmission scheme type and/or the allowed service type and the allowed transmission scheme type to the terminal device by using the generated access control information. The access control information includes different content in different implementations.

In a first implementation, the access control information includes a service type field and a data transmission attribute field. The access control information has a default action type. The action type is at least one of access barred and access allowed.

In a second implementation, the access control information includes an action type field, a service type field, and a data transmission attribute field. The action type field indicates an action type of the access control information, and the action type field includes at least one of access barred and access allowed.

An implementation used in this step is not limited in this embodiment.

A form of the access control information may be the same as the form of the overload start message. Details are not described again in this embodiment.

Step 604: The access network device sends the access control information to the terminal device.

Optionally, the access network device uses dedicated signaling to send the access control information to the terminal device, or sends the access control information in a broadcast message form in coverage of the access network device.

When the access network device needs to indicate a plurality of action types and/or service types and/or transmission scheme types to the terminal device, the access network device performs centralized indication in one piece of access control information sent to the terminal device, or performs separate indication in a plurality of pieces of access control information sent to the terminal device. This is not limited in this embodiment.

Step 605: The terminal device receives the access control information sent by the access network device.

When the access control information includes the service type field and the data transmission attribute field, and the access control information has the default action type, the terminal device determines the default action type of the access control information, obtains a service type by parsing the service type field, and obtains a transmission scheme type by parsing the data transmission attribute field.

When the access control information includes the action type field, the service type field, and the data transmission attribute field, the terminal device obtains an action type by parsing the action type field, obtains a service type by parsing the service type field, and obtains a transmission scheme type by parsing the data transmission attribute field.

The action type is at least one of access barred and access allowed. When the action type is access allowed, the method includes the following step 606:

Step 606: The terminal device sends an RRC connection request to the access network device when a service type of a current service meets the allowed service type and a transmission scheme type corresponding to the current service meets the allowed transmission scheme type.

The transmission scheme type corresponding to the current service is a transmission scheme type used by the terminal device for transmitting the current service.

The service type obtained by the terminal device by parsing the service type field in the access control information is an allowed service. The transmission scheme type obtained by parsing the data transmission attribute field is the allowed transmission scheme type.

For example, if the access control information received by the terminal device is (mo-Data, UP), and the default action type of the access control information is access allowed, the terminal device determines, by parsing the access control information, that the access control information indicates that an allowed service is a mo-Data service transmitted by using the UP scheme. When a service currently to be transmitted by the terminal device is a mo-Data service transmitted by using the UP scheme, the terminal device sends the RRC connection request to the access network device. When the service currently to be transmitted by the terminal device is a mo-Data service transmitted by using the CP scheme, the terminal device does not send the RRC connection request to the access network device.

Two different implementations are available when the action type is access barred.

In a first implementation, the access control information received by the terminal device includes an access control factor and an access control time period. The terminal device determines, based on the access control factor and the access control time period, whether to send an RRC connection request to the access network device.

The access control factor is a threshold used to be compared with a random number generated by the terminal device. The access control time period is used to set a time period for a timer when the random number generated by the terminal device is greater than or equal to the access control factor.

In a second implementation, the access control information received by the terminal device includes an access barring class. The terminal device determines, based on the access barring class, whether to send an RRC connection request to the access network device.

In this embodiment, if the first implementation is used as an example for description, the method further includes the following step 607 to step 610.

Step 607: Generate a random number when a service type of a current service meets the barred service type and a transmission scheme type corresponding to the current service meets the barred transmission scheme type.

The terminal device generates, according to a predetermined algorithm, a random number falling within (0, 1).

Step 608: The terminal device determines whether the random number is less than an access control factor.

Optionally, the access control factor is equal to 0.5.

Step 609: When the random number is less than the access control factor, the terminal device determines to send an RRC connection request to the access network device.

Step 610: When the random number is greater than or equal to the access control factor, set a timer based on an access control time period, and when the timer expires, re-execute the step of generating a random number.

Optionally, the access control time period is 10 seconds.

Optionally, timing duration of the timer=(0.7+0.6×rand)× access control time period, where rand is a random number that is generated by the terminal device and that is evenly distributed between 0 and 1. When the timer expires, step 607 is re-executed. It should be noted that step 609 and step 610 may be alternatively implemented as follows: when the random number is greater than or equal to the access control factor, the terminal device determines to send an RRC connection request to the access network device; when the random number is less than the access control factor, set a timer based on an access control time period, and when the timer expires, re-execute the step of generating a random number. This is not limited in this embodiment.

In an example, the access control information received by the terminal device is (barred, mo-Data, CP). The terminal device determines, by parsing the access control information, that the access control information indicates that a barred service is a mo-Data service transmitted by using the CP scheme. When a service type of a service currently transmitted by the terminal device is a mo-Data service, and a transmission scheme type used by the terminal device for transmitting the service is the CP scheme, the terminal device determines, based on the access control information, that the access control factor is 0.5 and the access control time period is 10 seconds. If the terminal device generates a random number such as 0.7, because 0.7>0.5, the terminal device generates another random number such as 0.4. In this case, the terminal device sets the timing duration of the timer to (0.7+0.6×0.4)×10=9.4 seconds. When the timer expires, that is, after 9.4 seconds, the terminal device generates another random number such as 0.3. Because 0.3<0.5, the terminal device determines to send the RRC connection request to the access network device.

It should be noted that one piece of access control information may indicate a plurality of action types, and the action types may include both access allowed and access barred. However, no intersection exists between a service type and a transmission scheme type for which access is allowed and a service type and a transmission scheme type for which access is barred. A related implementation is the same as that in the foregoing method. Details are not described again in this embodiment.

Figure 7:
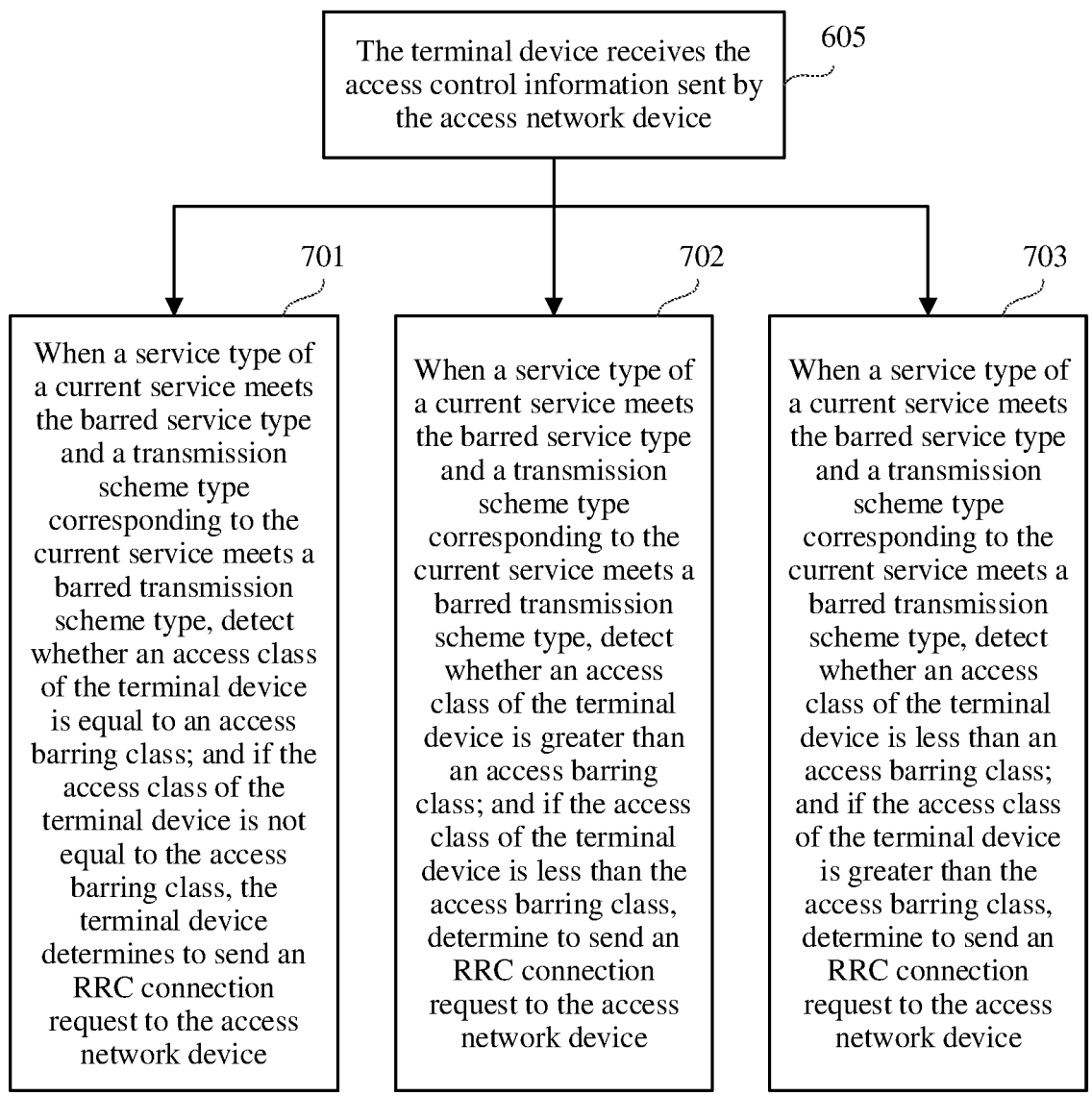
FIG. 7 is a flowchart of a radio access control method according to another example embodiment.

An optional embodiment based on the foregoing embodiment is described by using an example in which the action type of the access control information received by the terminal device is access barred, and the second implementation is used to determine whether to send the RRC connection request to the access network device. In this case, the access control information received by the terminal device further includes the access barring class, and step 607 to step 610 may be alternatively implemented as any one of the following steps, as shown in FIG. 7.

Step 701: When a service type of a current service meets the barred service type and a transmission scheme type corresponding to the current service meets the barred transmission scheme type, detect whether an access class of the terminal device is equal to an access barring class; and if the access class of the terminal device is not equal to the access barring class, the terminal device determines to send an RRC connection request to the access network device.

Different terminal devices have different access classes. The access class of the terminal device is preset.

In an example, the access control information received by the terminal device is (barred, mo-Data, CP). The terminal device determines, by parsing the access control information, that the access control information indicates that a barred service is a mo-Data service transmitted by using the CP scheme. When a service type of a service currently transmitted by the terminal device is a mo-Data service, and a transmission scheme type used by the terminal device for transmitting the service is the CP scheme, the terminal device determines that the access barring class included in the access control information is 2. When the access class of the terminal device is 2, the terminal device does not send the RRC connection request to the access network device. When the access class of the terminal device is 3, the terminal device sends the RRC connection request to the access network device.

Alternatively, another alternative implementation solution of step 701 is illustrated in step 702.

Step 702: When a service type of a current service meets the barred service type and a transmission scheme type corresponding to the current service meets the barred transmission scheme type, detect whether an access class of the terminal device is greater than an access barring class; and if the access class of the terminal device is less than the access barring class, determine to send an RRC connection request to the access network device.

In the foregoing example embodiment, when the service type of the service currently transmitted by the terminal device is a mo-Data service, and the transmission scheme type used by the terminal device for transmitting the service is the CP scheme, the terminal device determines that the access barring class included in the access control information is 2. If the access class of the terminal device is 1, the terminal device sends the RRC connection request to the access network device. If the access class of the terminal device is 3, the terminal device does not send the RRC connection request to the access network device.

Alternatively, another alternative implementation solution of step 701 is illustrated in step 703.

Step 703: When a service type of a current service meets the barred service type and a transmission scheme type corresponding to the current service meets the barred transmission scheme type, detect whether an access class of the terminal device is less than an access barring class; and if the access class of the terminal device is greater than the access barring class, determine to send an RRC connection request to the access network device.

In the foregoing example embodiment, when the service type of the service currently transmitted by the terminal device is a mo-Data service, and the transmission scheme type used by the terminal device for transmitting the service is the CP scheme, the terminal device determines that the access barring class included in the access control information is 2. If the access class of the terminal device is 3, the terminal device sends the RRC connection request to the access network device. If the access class of the terminal device is 1, the terminal device does not send the RRC connection request to the access network device.

In this embodiment, the terminal device executes any one of step 701 to step 703. A used step is not limited in this embodiment.

In view of the above, according to the radio access control method provided in this embodiment of this disclosure, the MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: the access network device may bar and/or allow, based on the instruction of the MME, only access of a service that meets both the service type and the data transmission attribute, and service capabilities are provided for as many service types as possible without significantly increasing the load of the MME, thereby improving network resource utilization.

In view of the above, according to the radio access control method provided in this embodiment of this disclosure, the MME indicates the barred service type and the barred transmission scheme type and/or the allowed service type and the allowed transmission scheme type to the access network device. In this way, the MME may instruct the access network device to bar and/or allow access of a service transmitted by using a transmission scheme type. Because a load of the MME when service data is transmitted by using the user plane scheme is different from a load of the MME when service data is transmitted by using the control plane scheme, the MME may instruct, as required, the access network device to bar and/or allow a service transmitted by using a transmission scheme type, so that when the load of the MME is relatively heavy, access of a service transmitted by using a transmission scheme type corresponding to heavier load is barred, but a service transmitted by using a transmission scheme type corresponding to lighter load may still be received. This improves network resource utilization.

A data transmission attribute includes a transmission scheme type and/or a RAT type. The following embodiment is described by using an example in which the data transmission attribute is the RAT type. In this case, a data transmission attribute field is a RAT type field.

Figure 8A:
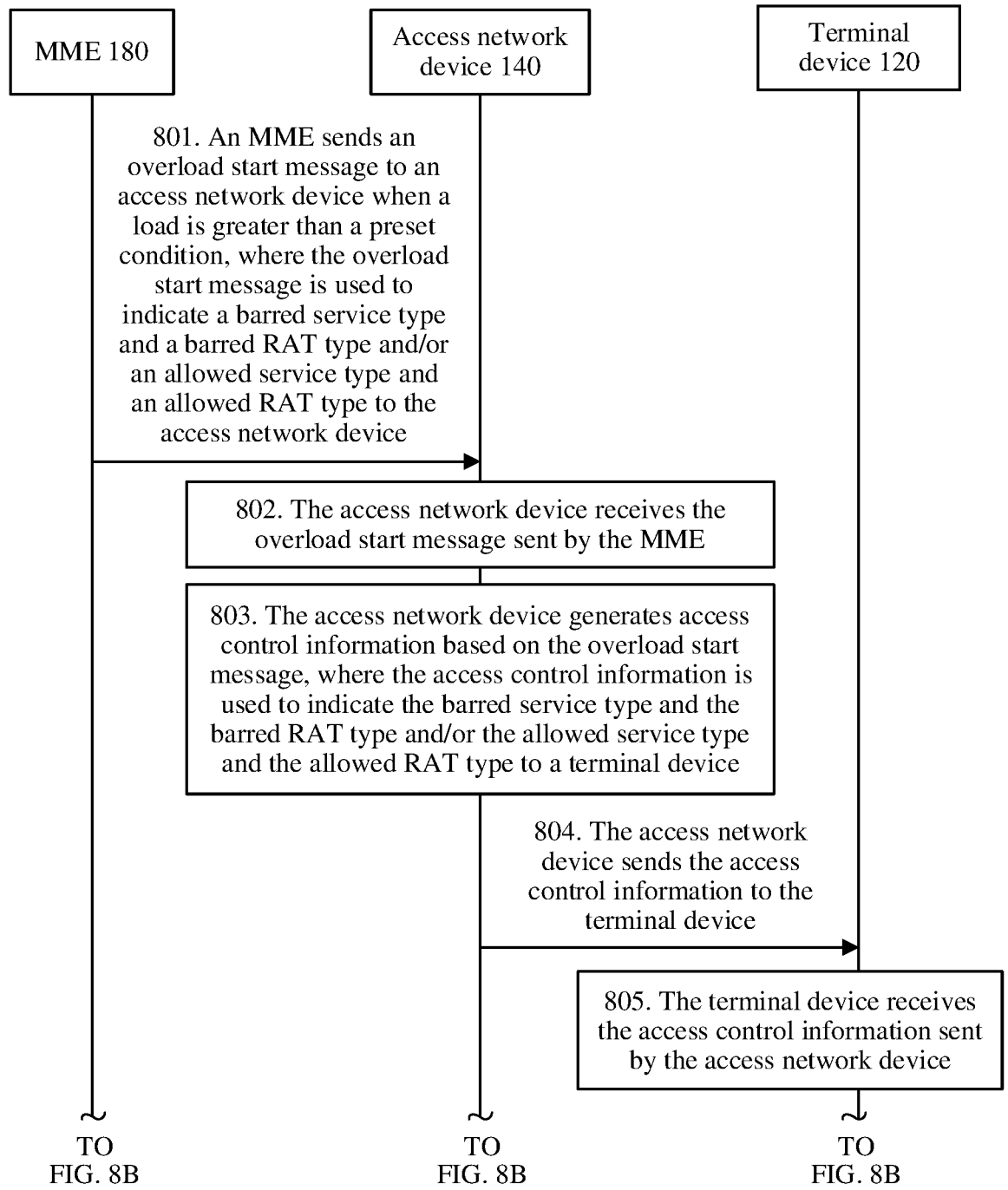
FIG. 8A and FIG. 8B are a flowchart of a radio access control method according to another example embodiment.
Figure 8B:
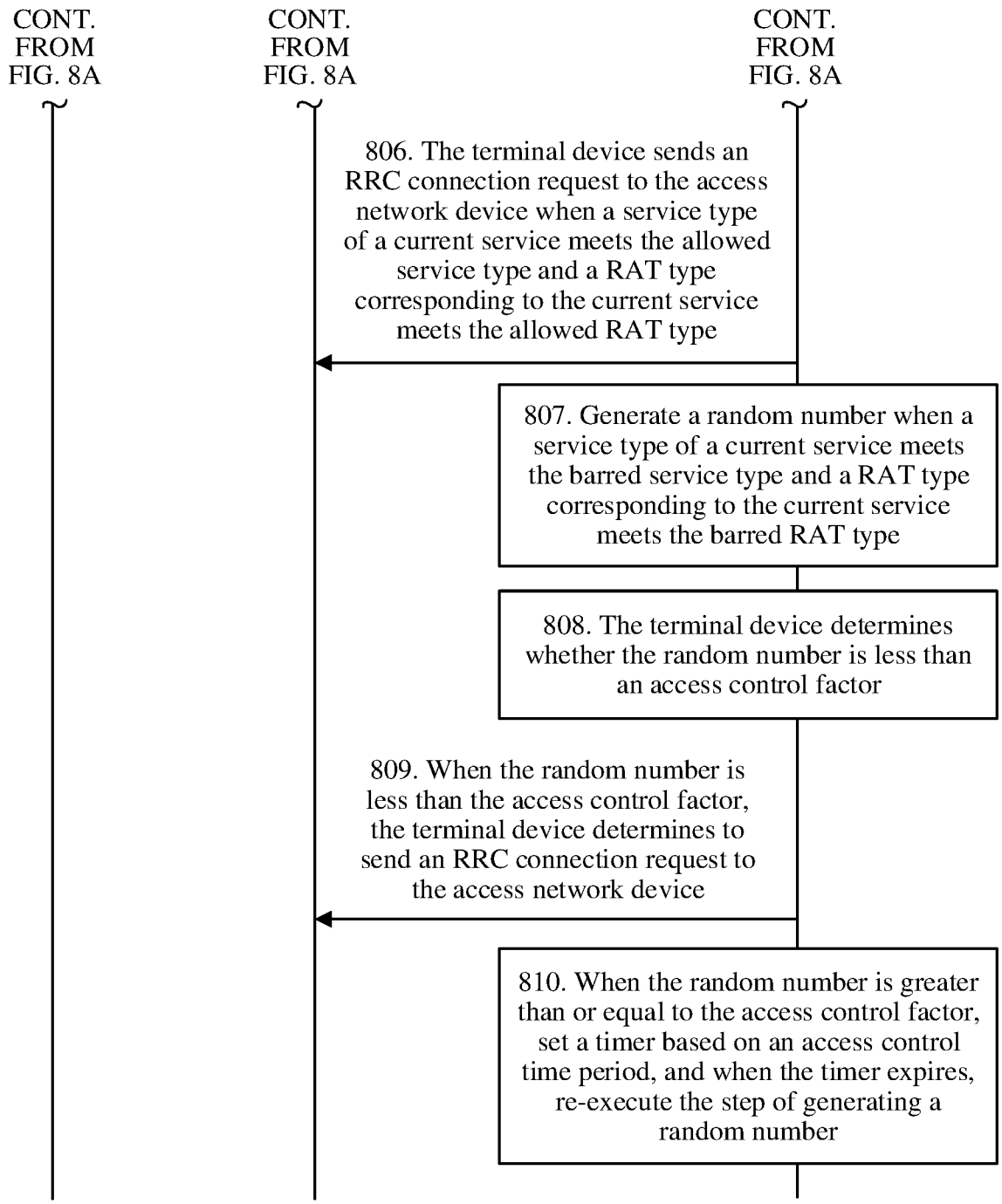

Referring to FIG. 8A and FIG. 8B, FIG. 8A and FIG. 8B are a flowchart of a radio access control method according to an example embodiment of the present disclosure. This embodiment is described by using an example in which the method is applied to the radio access control system shown in FIG. 1. The method includes the following steps.

Step 801: An MME sends an overload start message to an access network device when load is greater than a preset condition, where the overload start message indicates a barred service type and a barred RAT type and/or an allowed service type and an allowed RAT type to the access network device.

Two different implementations are available for the MME to send the overload start message to the access network device to indicate the barred service type and the barred RAT type and/or the allowed service type and the allowed RAT type. The overload start message includes different content in different implementations.

In a first implementation, the overload start message includes a service type field and a RAT type field. The overload start message has a default action type. The action type is at least one of access barred and access allowed. The default action type of the overload start message may be preset.

In a second implementation, the overload start message includes an action type field, a service type field, and a RAT type field. The action type field indicates an action type of the overload start message, and the action type field includes at least one of access barred and access allowed.

An implementation used in this step is not limited in this embodiment.

The RAT type field indicates a radio access technology used by a terminal device. The RAT type field includes at least one of the WB-E-UTRAN and the NB-IoT.

Optionally, the RAT type field may further include 5G or another radio access technology. This is not limited in this embodiment.

In the two implementations, a service type indicated by the service type field is the same as that in the embodiment shown in FIG. 6A and FIG. 6B. For a form and content of the overload start message, refer to the overload start message illustrated in step 601 in FIG. 6A. Details are not described again in this embodiment.

Step 802: The access network device receives the overload start message sent by the MME.

For a method for determining the action type and the service type of the overload start message by the access network device, refer to step 602 in the embodiment shown in FIG. 6A. Details are not described again in this embodiment. In this embodiment, the access network device determines the action type and the service type, and parses the RAT type field to obtain a RAT type.

Step 803: The access network device generates access control information based on the overload start message, where the access control information indicates the barred service type and the barred RAT type and/or the allowed service type and the allowed RAT type to a terminal device.

An action type indicated by the access control information is the same as the default action type that is of the overload start message and that is determined by the access network device.

A service type indicated by the access control information is the same as the service type obtained by the access network device by parsing the service type field in the overload start message. A RAT type indicated by the access control information is the same as the RAT type obtained by the access network device by parsing the data transmission attribute field in the overload start message.

Two different implementations are available for the access network device to indicate the barred service type and the barred RAT type and/or the allowed service type and the allowed RAT type to the terminal device by using the generated access control information. The access control information includes different content in different implementations.

In a first implementation, the access control information includes a service type field and a RAT type field. The access control information has a default action type. The action type is at least one of access barred and access allowed.

In a second implementation, the access control information includes an action type field, a service type field, and a RAT type field. The action type field indicates an action type of the access control information, and the action type field includes at least one of access barred and access allowed.

An implementation used in this step is not limited in this embodiment.

A form of the access control information may be the same as the form of the overload start message. Details are not described again in this embodiment.

Step 804: The access network device sends the access control information to the terminal device.

For a method for sending the access control information to the terminal device by the access network device, refer to step 604 in the embodiment shown in FIG. 6A. Details are not described again in this embodiment.

Step 805: The terminal device receives the access control information sent by the access network device.

For a method for determining the action type and the service type of the access control information by the terminal device, refer to step 605 in the embodiment shown in FIG. 6A. Details are not described again in this embodiment. In this embodiment, the terminal device determines the action type and the service type, and parses the RAT type field to obtain a RAT type.

The action type is at least one of access barred and access allowed. When the action type is access allowed, the method includes the following step 806:

Step 806: The terminal device sends an RRC connection request to the access network device when a service type of a current service meets the allowed service type and a RAT type corresponding to the current service meets the allowed RAT type.

The RAT type corresponding to the current service is a RAT type used by the terminal device transmitting the current service for accessing the access network device.

The service type obtained by the terminal device by parsing the service type field in the access control information is an allowed service. The RAT type obtained by parsing the RAT type field is the allowed RAT type.

When a service currently transmitted by the terminal device is an allowed service, and a used RAT type is the allowed RAT type, the terminal device sends the RRC connection request to the access network device by using the RAT type.

Two different implementations are available when the action type is access barred.

In a first implementation, the access control information received by the terminal device includes an access control factor and an access control time period. The terminal device determines, based on the access control factor and the access control time period, whether to send an RRC connection request to the access network device. Meanings of the access control factor and the access control time period in this embodiment are the same as meanings of the access control factor and the access control time period in the foregoing embodiment. Details are not described again in this embodiment.

In a second implementation, the access control information received by the terminal device includes an access barring class. The terminal device determines, based on the access barring class, whether to send an RRC connection request to the access network device.

In this embodiment, if the first implementation is used as an example for description, the method further includes the following step 807 to step 810.

Step 807: Generate a random number when a service type of a current service meets the barred service type and a RAT type corresponding to the current service meets the barred RAT type.

Step 808: The terminal device determines whether the random number is less than an access control factor.

Step 809: When the random number is less than the access control factor, the terminal device determines to send an RRC connection request to the access network device.

Step 810: When the random number is greater than or equal to the access control factor, set a timer based on an access control time period, and when the timer expires, re-execute the step of generating a random number.

For an implementation in which the terminal device uses the first implementation to determine whether to send the RRC connection request to the access network device, refer to step 607 to step 610 in the embodiment shown in FIG. 6B. Details are not described again in this embodiment.

It should be noted that one piece of access control information may indicate a plurality of action types, and the action types may include both access allowed and access barred. Implementations of the action type of access allowed and the action type of access barred are the same as those in the foregoing method. Details are not described again in this embodiment.

Figure 9:
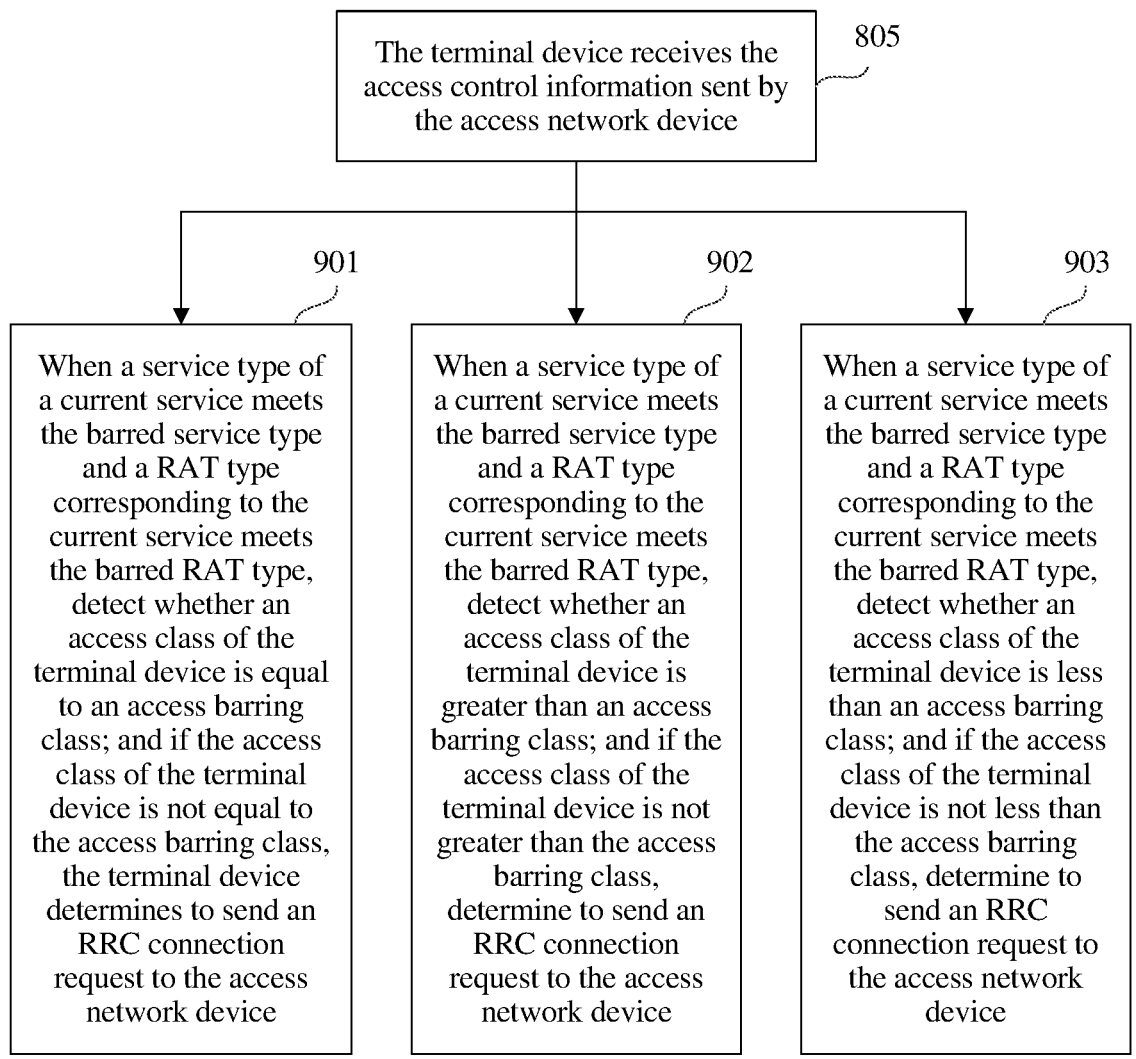
FIG. 9 is a flowchart of a radio access control method according to another example embodiment.

Another optional embodiment based on the foregoing embodiment is described by using an example in which the action type of the access control information received by the terminal device is access barred, and the second implementation is used to determine whether to send the RRC connection request to the access network device. In this case, the access control information received by the terminal device further includes the access barring class, and step 807 to step 810 may be alternatively implemented as any one of the following steps, as shown in FIG. 9.

Step 901: When a service type of a current service meets the barred service type and a RAT type corresponding to the current service meets the barred RAT type, detect whether an access class of the terminal device is equal to an access barring class; and if the access class of the terminal device is not equal to the access barring class, the terminal device determines to send an RRC connection request to the access network device.

Alternatively, another alternative implementation solution of step 901 is illustrated in step 902.

Step 902: When a service type of a current service meets the barred service type and a RAT type corresponding to the current service meets the barred RAT type, detect whether an access class of the terminal device is greater than an access barring class; and if the access class of the terminal device is less than the access barring class, determine to send an RRC connection request to the access network device.

Alternatively, another alternative implementation solution of step 901 is illustrated in step 903.

Step 903: When a service type of a current service meets the barred service type and a RAT type corresponding to the current service meets the barred RAT type, detect whether an access class of the terminal device is less than an access barring class; and if the access class of the terminal device is greater than the access barring class, determine to send an RRC connection request to the access network device.

In this embodiment, for implementations of step 901 to step 903, refer to step 701 to step 703 in the embodiment shown in FIG. 7. Details are not described again in this embodiment. The terminal device executes any one of step 901 to step 903. A used step is not limited in this embodiment.

In view of the above, according to the radio access control method provided in this embodiment of this disclosure, the MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: the access network device may bar and/or allow, based on the instruction of the MME, only access of a service that meets both the service type and the data transmission attribute, and service capabilities are provided for as many service types as possible without significantly increasing the load of the MME, thereby improving network resource utilization.

According to the radio access control method provided in this embodiment of this disclosure, the MME indicates the barred service type and the barred RAT type and/or the allowed service type and the allowed RAT type to the access network device. In this way, the MME may instruct the access network device to receive only a service transmitted by a terminal device that gets access by using a RAT type. A first-type terminal device that gets access by using the WB-E-UTRAN is usually a terminal device used by a user, and a second-type terminal device that gets access by using the NB-IoT is usually a smart instrument or a smart meter. Therefore, when the load of the MME is relatively heavy, the MME may instruct, as required, to bar and/or allow a service transmitted by a terminal device that gets access by using a RAT type, so that only a service transmitted by a type of terminal device may be received as required when the load of the MME is relatively heavy. This improves network service quality.

A data transmission attribute includes a transmission scheme type and/or a RAT type. The following embodiment is described by using an example in which the data transmission attribute includes the transmission scheme type and the RAT type.

Figure 10A:
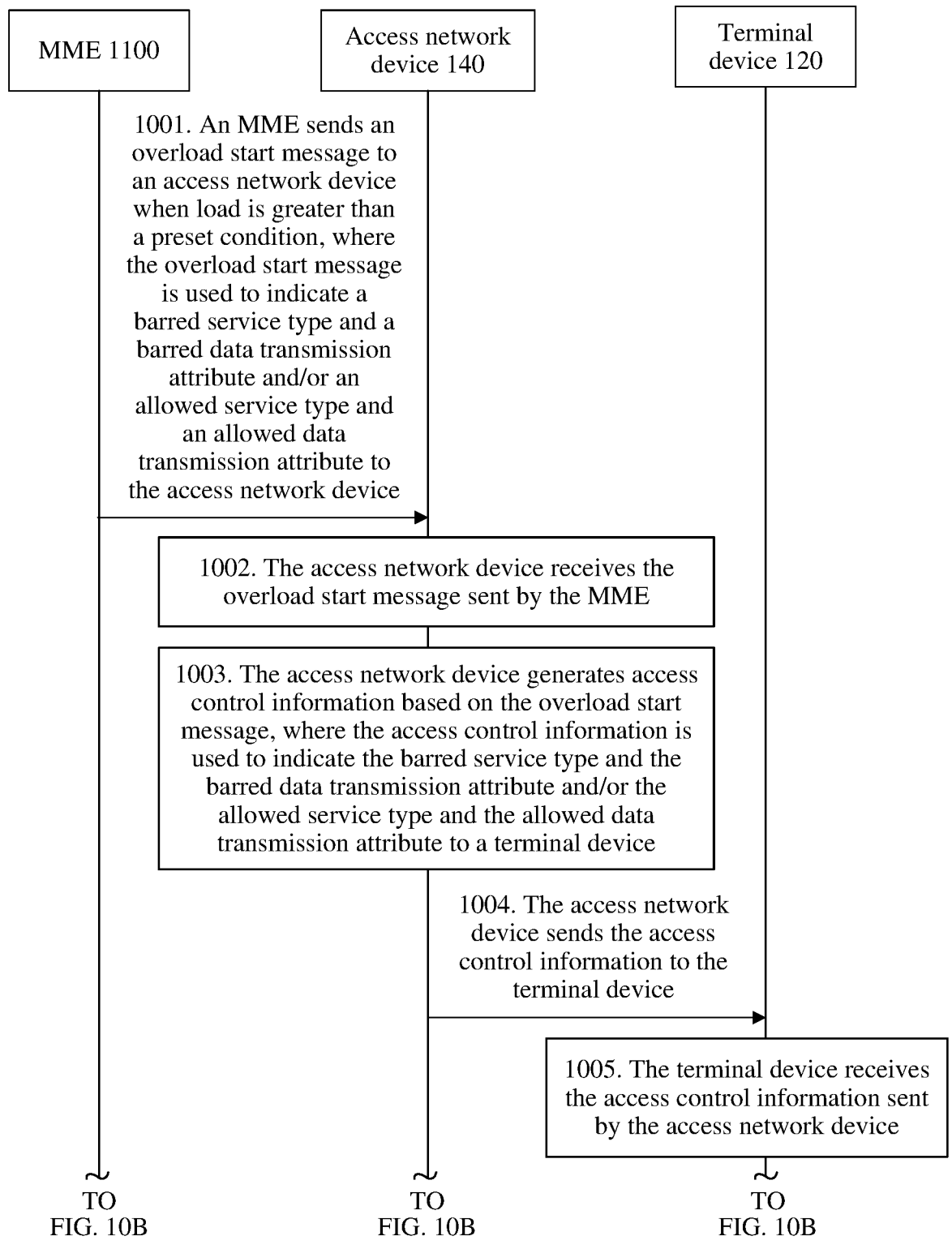
FIG. 10A and FIG. 10B are a flowchart of a radio access control method according to another example embodiment.
Figure 10B:
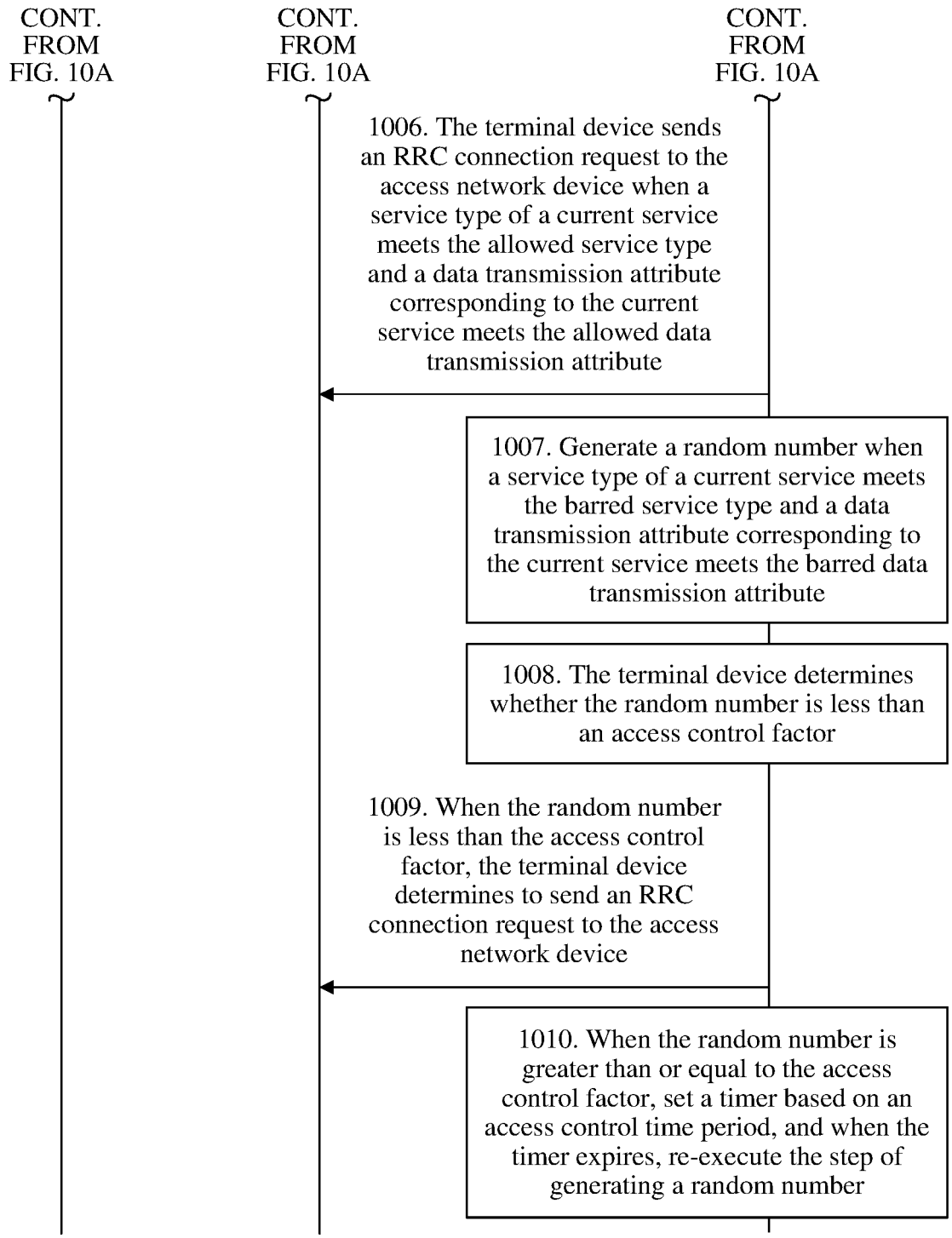

Referring to FIG. 10A and FIG. 10B, FIG. 10A and FIG. 10B are a flowchart of a radio access control method according to an example embodiment of the present disclosure. This embodiment is described by using an example in which the method is applied to the radio access control system shown in FIG. 1. The method includes the following steps.

Step 1001: An MME sends an overload start message to an access network device when load is greater than a preset condition, where the overload start message indicates a barred service type and a barred data transmission attribute and/or an allowed service type and an allowed data transmission attribute to the access network device.

In this embodiment, the data transmission attribute includes a transmission scheme type and a RAT type. The transmission scheme type indicates a transmission scheme used by a terminal device for transmitting service data. The RAT type indicates a radio access technology used by the terminal device.

Two different implementations are available for the MME to send the overload start message to the access network device to indicate the barred service type and the barred data transmission attribute and/or the allowed service type and the allowed data transmission attribute. The overload start message includes different content in different implementations.

In a first implementation, the overload start message includes a service type field and a data transmission attribute field. The overload start message has a default action type. The action type is at least one of access barred and access allowed. The default action type of the overload start message may be preset.

In a second implementation, the overload start message includes an action type field, a service type field, and a data transmission attribute field. The action type field indicates an action type of the overload start message, and the action type field includes at least one of access barred and access allowed.

An implementation used in this step is not limited in this embodiment.

In the two implementations, a service type indicated by the service type field is the same as the service type illustrated in the foregoing embodiment. The data transmission attribute field includes a transmission scheme type field and a RAT type field. The transmission scheme type field is the same as that in the embodiment shown in FIG. 6A and FIG. 6B. The RAT type field is the same as that in the embodiment shown in FIG. 8A and FIG. 8B. Details are not described again in this embodiment.

For example, if the default action type of the overload start message sent by the MME to the access network device is access allowed, and the overload start message is (mo-Data, WB-E-UTRAN, UP), it indicates that an allowed service is a mo-Data service transmitted by using a UP scheme by a terminal device that gets access by using the WB-E-UTRAN. Alternatively, if the overload start message may be (barred, mo-Data, NB-IoT, CP), it indicates that a barred service is a mo-Data service transmitted by using a CP scheme by a terminal device that gets access by using the NB-IoT. A form and content of the overload start message are not limited in this embodiment.

Step 1002: The access network device receives the overload start message sent by the MME.

For a method for determining the action type and the service type of the overload start message by the access network device, refer to step 602 in the embodiment shown in FIG. 6A. Details are not described again in this embodiment. In this embodiment, the access network device determines the action type and the service type, and parses the data transmission type field to obtain the transmission scheme type and the RAT type.

Step 1003: The access network device generates access control information based on the overload start message, where the access control information indicates the barred service type and the barred data transmission attribute and/or the allowed service type and the allowed data transmission attribute to a terminal device.

An action type indicated by the access control information is the same as the default action type that is of the overload start message and that is determined by the access network device.

A service type indicated by the access control information is the same as the service type obtained by the access network device by parsing the service type field in the overload start message. A data transmission attribute indicated by the access control information is the same as the data transmission attribute obtained by the access network device by parsing the data transmission attribute field in the overload start message. A transmission scheme type indicated by the access control information is the same as the transmission scheme type in the overload start message, and a RAT type indicated by the access control information is the same as the RAT type in the overload start message.

Two different implementations are available for the access network device to indicate the barred service type and the barred data transmission attribute and/or the allowed service type and the allowed data transmission attribute to the terminal device by using the generated access control information. The access control information includes different content in different implementations.

In a first implementation, the access control information includes a service type field and a data transmission attribute field. The access control information has a default action type. The action type is at least one of access barred and access allowed.

In a second implementation, the access control information includes an action type field, a service type field, and a data transmission attribute field. The action type field indicates an action type of the access control information, and the action type field includes at least one of access barred and access allowed.

An implementation used in this step is not limited in this embodiment.

A form of the access control information may be the same as the form of the overload start message. Details are not described again in this embodiment.

Step 1004: The access network device sends the access control information to the terminal device.

A method for sending the access control information by the access network device to the terminal device is the same as that in the foregoing embodiment. Details are not described again in this embodiment.

Step 1005: The terminal device receives the access control information sent by the access network device.

For a method for determining the action type and the service type of the access control information by the terminal device, refer to step 605 in the embodiment shown in FIG. 6A. Details are not described again in this embodiment. In this embodiment, the terminal device determines the action type and the service type, and parses the data transmission attribute field to obtain the transmission scheme type and the RAT type.

The action type is at least one of access barred and access allowed. When the action type is access allowed, the method includes the following step 1006:

Step 1006: The terminal device sends an RRC connection request to the access network device when a service type of a current service meets the allowed service type and a data transmission attribute corresponding to the current service meets the allowed data transmission attribute.

The data transmission attribute corresponding to the current service is a RAT type used by the terminal transmitting the current service for accessing the access network device, and a transmission scheme type used by the terminal device for transmitting the current service.

The service type obtained by the terminal device by parsing the service type field in the access control information is an allowed service. The transmission scheme type and the RAT type that are obtained by parsing the data transmission attribute field is an allowed transmission scheme type and an allowed RAT type.

When a service currently transmitted by the terminal device is an allowed service, a used transmission scheme type is the allowed transmission scheme type, and a used RAT type is the allowed RAT type, the terminal device sends the RRC connection request to the access network device by using the RAT type.

Two different implementations are available when the action type is access barred.

In a first implementation, the access control information received by the terminal device includes an access control factor and an access control time period. The terminal device determines, based on the access control factor and the access control time period, whether to send an RRC connection request to the access network device. Meanings of the access control factor and the access control time period in this embodiment are the same as meanings of the access control factor and the access control time period in the foregoing embodiment. Details are not described again in this embodiment.

In a second implementation, the access control information received by the terminal device includes an access barring class. The terminal device determines, based on the access barring class, whether to send an RRC connection request to the access network device.

In this embodiment, if the first implementation is used as an example for description, the method further includes the following step 1007 to step 1010.

Step 1007: Generate a random number when a service type of a current service meets the barred service type and a data transmission attribute corresponding to the current service meets the barred data transmission attribute.

Step 1008: The terminal device determines whether the random number is less than an access control factor.

Step 1009: When the random number is less than the access control factor, the terminal device determines to send an RRC connection request to the access network device.

Step 1010: When the random number is greater than or equal to the access control factor, set a timer based on an access control time period, and when the timer expires, re-execute the step of generating a random number.

For an implementation in which the terminal device uses the first implementation to determine whether to send the RRC connection request to the access network device, refer to step 607 to step 610 in the embodiment shown in FIG. 6B. Details are not described again in this embodiment.

It should be noted that one piece of access control information may indicate a plurality of action types, and the action types may include both access allowed and access barred. Implementations of the action type of access allowed and the action type of access barred are the same as those in the foregoing method. Details are not described again in this embodiment.

Figure 11:
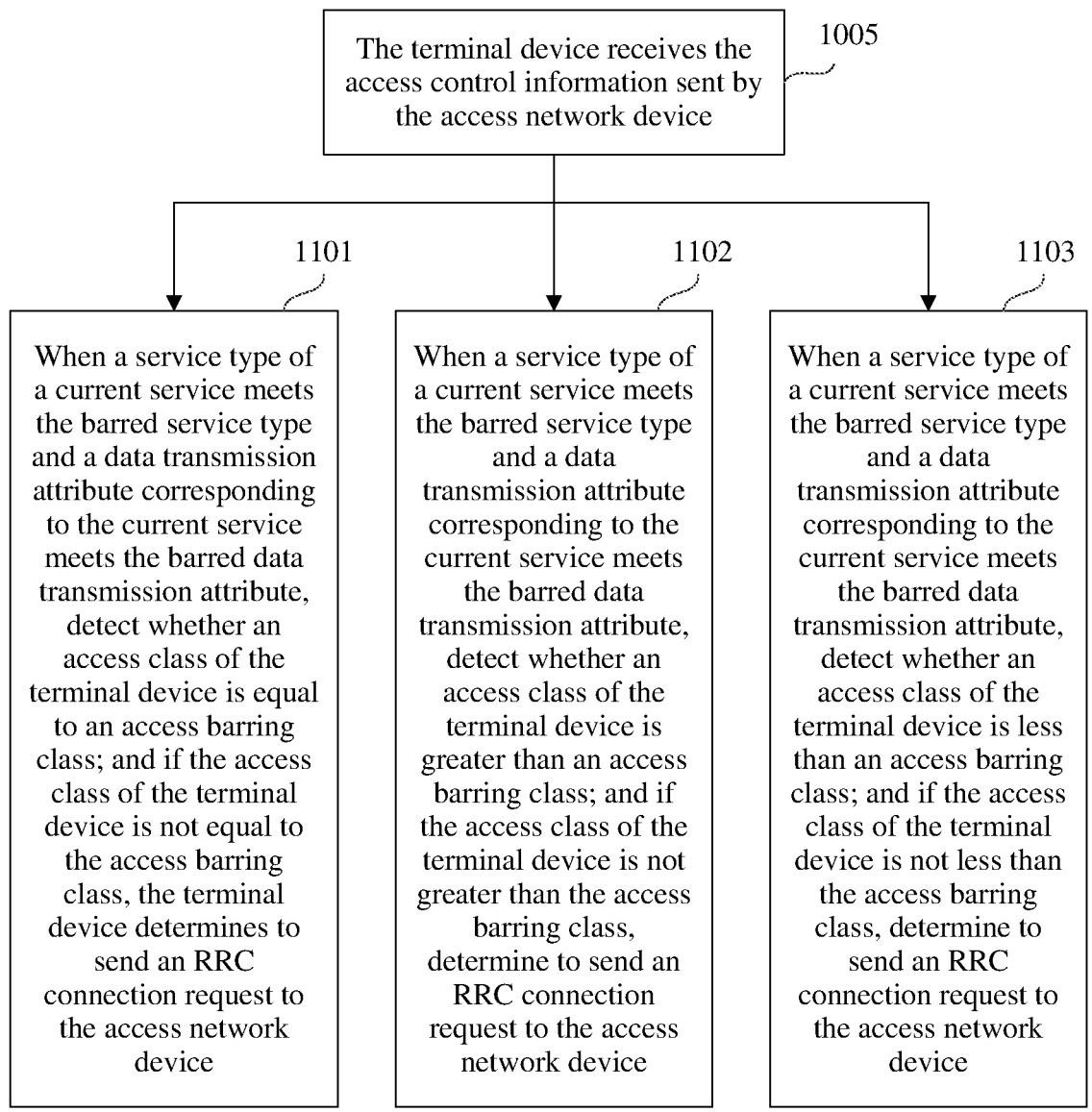
FIG. 11 is a flowchart of a radio access control method according to another example embodiment.

Another optional embodiment based on the foregoing embodiment is described by using an example in which the action type of the access control information received by the terminal device is access barred, and the second implementation is used to determine whether to send the RRC connection request to the access network device. In this case, the access control information received by the terminal device further includes the access barring class, and step 1007 to step 1010 may be alternatively implemented as any one of the following steps, as shown in FIG. 11.

Step 1101: When a service type of a current service meets the barred service type and a data transmission attribute corresponding to the current service meets the barred data transmission attribute, detect whether an access class of the terminal device is equal to an access barring class; and if the access class of the terminal device is not equal to the access barring class, the terminal device determines to send an RRC connection request to the access network device.

Step 1102: When a service type of a current service meets the barred service type and a data transmission attribute corresponding to the current service meets the barred data transmission attribute, detect whether an access class of the terminal device is greater than an access barring class; and if the access class of the terminal device is less than the access barring class, determine to send an RRC connection request to the access network device.

Step 1103: When a service type of a current service meets the barred service type and a data transmission attribute corresponding to the current service meets the barred data transmission attribute, detect whether an access class of the terminal device is less than an access barring class; and if the access class of the terminal device is greater than the access barring class, determine to send an RRC connection request to the access network device.

In this embodiment, for implementations of step 1101 to step 1103, refer to step 701 to step 703 in the embodiment shown in FIG. 7. Details are not described again in this embodiment. The terminal device executes any one of step 1101 to step 1103. A used step is not limited in this embodiment.

In view of the above, according to the radio access control method provided in this embodiment of this disclosure, the MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: The access network device may bar and/or allow, based on the instruction of the MME, only access of a service that meets both the service type and the data transmission attribute, and service capabilities are provided for as many service types as possible without significantly increasing the load of the MME, thereby improving network resource utilization.

According to the radio access control method provided in this embodiment, the MME indicates the barred service type and the barred data transmission attribute and/or the allowed service type and the allowed data transmission attribute to the access network device. The data transmission attribute includes the transmission scheme type and the RAT type. In this way, the MME may instruct the access network device to bar and/or allow a service transmitted by using a transmission scheme type by a terminal device that gets access by using a RAT type. When the load of the MME is relatively heavy, a service that is corresponding to lighter load and that is transmitted by a type of terminal device may still be allowed. This improves network resource utilization, and improves network service quality.

Figure 12A:
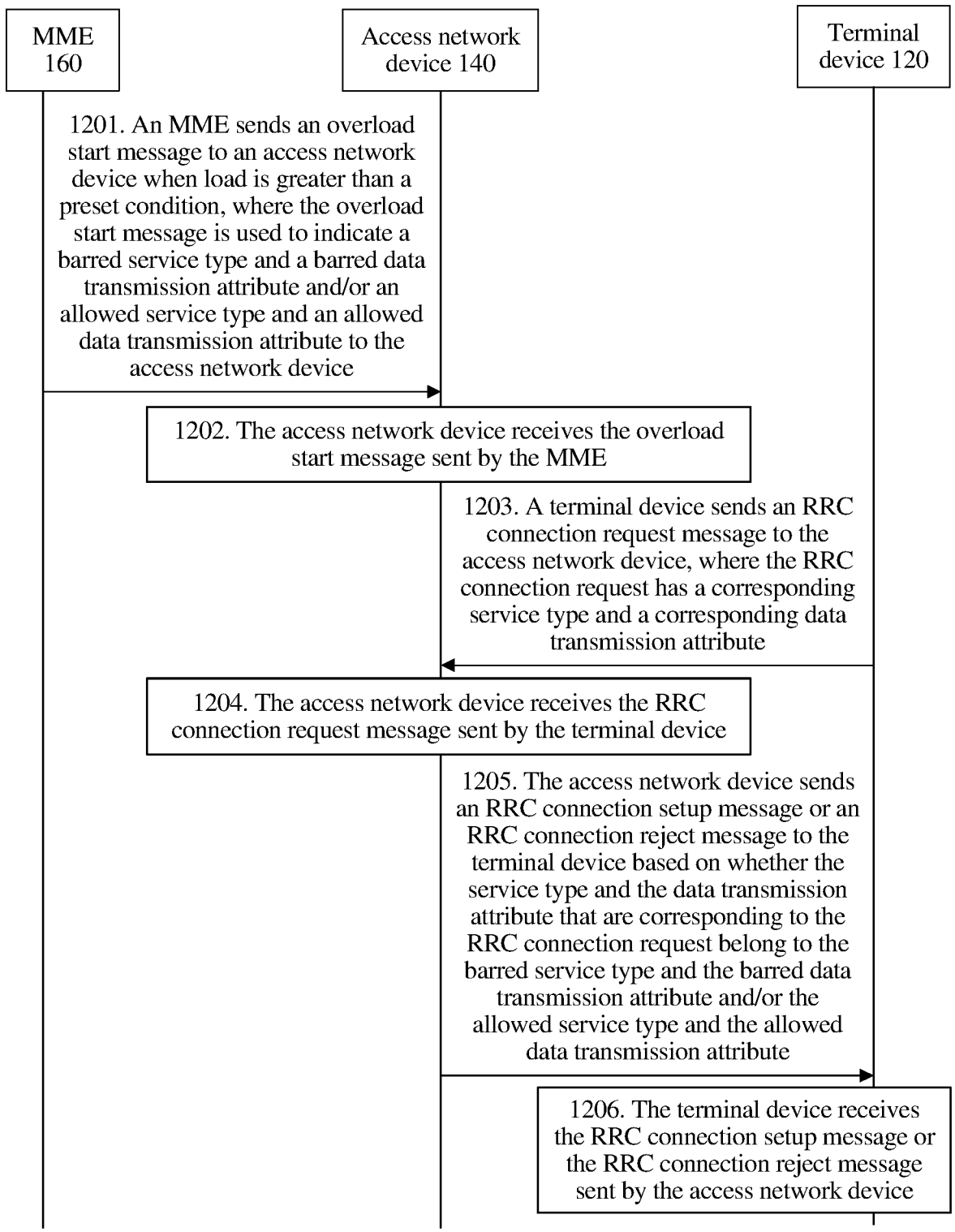
FIG. 12A is a flowchart of a radio access control method according to another example embodiment.

Referring to FIG. 12A, FIG. 12A is a flowchart of a radio access control method according to another example embodiment of the present disclosure. This embodiment is described by using an example in which the method is applied to the radio access control system shown in FIG. 1. The method includes the following steps.

Step 1201: An MME sends an overload start message to an access network device when load is greater than a preset condition, where the overload start message indicates a barred service type and a barred data transmission attribute and/or an allowed service type and an allowed data transmission attribute to the access network device.

Step 1202: The access network device receives the overload start message sent by the MME.

A method for determining the barred service type and the barred data transmission attribute and/or the allowed service type and the allowed data transmission attribute by the access network device based on the overload start message is the same as that in the foregoing embodiment. Details are not described again in this embodiment.

Step 1203: A terminal device sends an RRC connection request message to the access network device, where the RRC connection request has a corresponding service type and a corresponding data transmission attribute.

The RRC connection request is triggered by a service transmitted by the terminal device. The service type and the data transmission attribute that are corresponding to the RRC connection request are a type of the service that triggers the RRC connection request and a data transmission attribute used when the terminal device transmits the service.

For example, if the RRC connection request is triggered when the terminal device uses a CP scheme to transmit a mo-Data service, the service type corresponding to the RRC connection request is the mo-Data service, and the data transmission attribute corresponding to the RRC connection request is the CP scheme.

Optionally, the RRC connection request message further includes a service type field and a data transmission attribute field.

The service type field indicates a service type. The data transmission attribute field indicates a data transmission attribute. Content of the service type field and the data transmission attribute field is the same as that in the foregoing example embodiment. Details are not described again in this embodiment.

Step 1204: The access network device receives the RRC connection request message sent by the terminal device.

The access network device parses the RRC connection request message to determine the service type and the data transmission attribute that are corresponding to the RRC connection request.

Step 1205: The access network device sends an RRC connection setup message or an RRC connection reject message to the terminal device based on whether the service type and the data transmission attribute that are corresponding to the RRC connection request belong to the barred service type and the barred data transmission attribute and/or the allowed service type and the allowed data transmission attribute.

When the service type and the data transmission attribute that are corresponding to the RRC connection request are the allowed service type and the allowed data transmission attribute, the RRC connection setup message is sent to the terminal device, and an RRC connection is established with the terminal device.

The RRC connection reject message is sent to the terminal device when the service type and the data transmission attribute that are corresponding to the RRC connection request are the barred service type and the barred data transmission attribute.

Optionally, two different implementations are further included when the service type and the data transmission attribute that are corresponding to the RRC connection request are the barred service type and the barred data transmission attribute.

In a first implementation, when the service type and the data transmission attribute that are corresponding to the RRC connection request are the barred service type and the barred data transmission attribute, the access network device generates a random number, and determines whether the random number is less than an access control factor. The access network device sends an RRC connection request message to the terminal device when the random number is less than the access control factor. The access network device sends an RRC connection reject message to the terminal device when the random number is not less than the access control factor. For a meaning and an implementation of the access control factor, refer to the foregoing embodiment. Details are not described again in this embodiment.

In a second implementation, the RRC connection request message further includes an access class of the terminal device.

When the service type and the data transmission attribute that are corresponding to the RRC connection request are the barred service type and the barred data transmission attribute, the access network device determines whether the access class of the terminal device is equal to an access barring class. If the access class of the terminal device is not equal to the access barring class, the access network device sends an RRC connection setup message to the terminal device. If the access class of the terminal device is equal to the access barring class, the access network device sends an RRC connection reject message to the terminal device. The method may be alternatively implemented as detecting whether the access class of the terminal device is greater than or less than the access barring class. An implementation is similar to that in the foregoing embodiment. Details are not described again in this embodiment.

Step 1206: The terminal device receives the RRC connection setup message or the RRC connection reject message sent by the access network device.

Figure 12B:
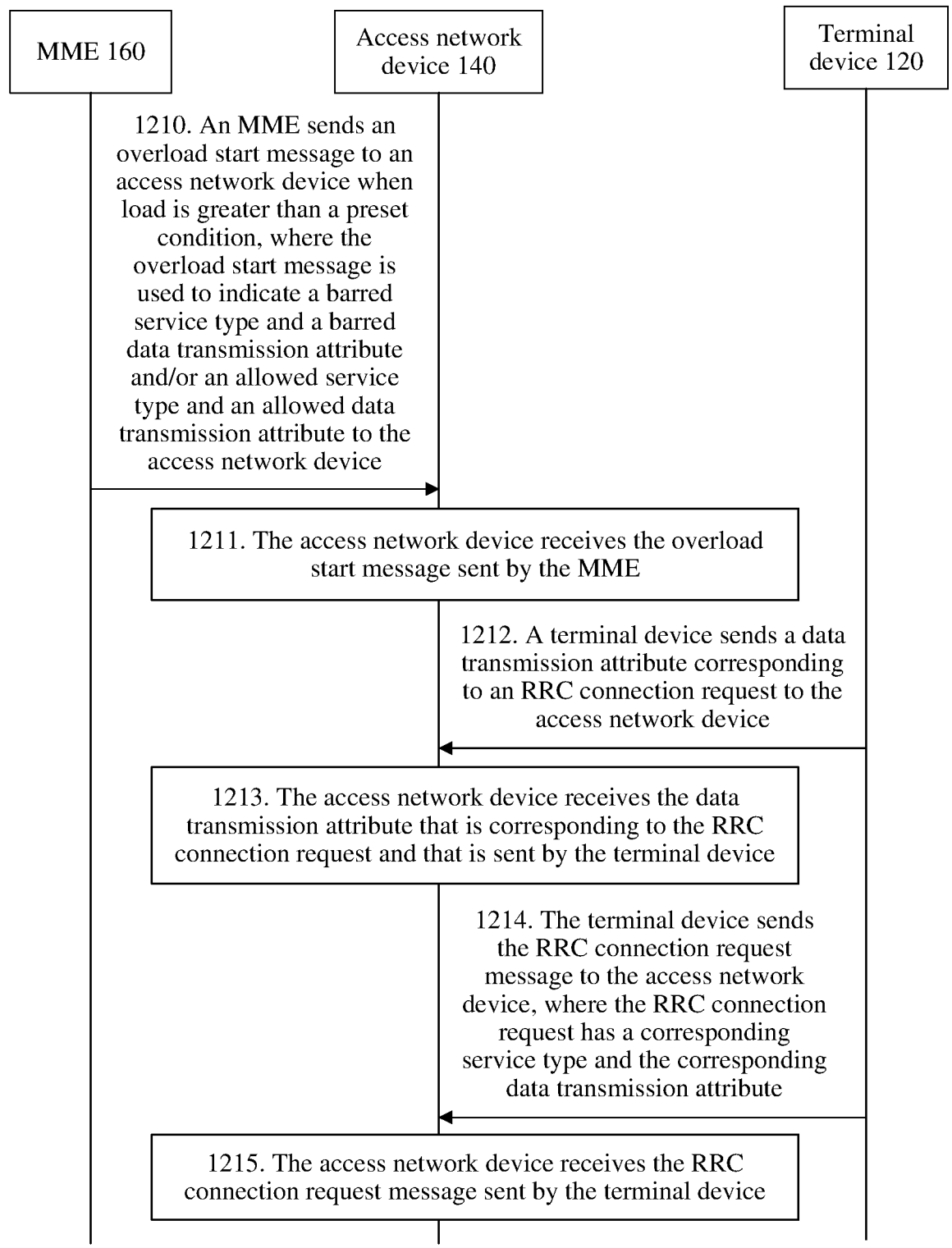
FIG. 12B is a flowchart of a radio access control method according to another example embodiment.

In the embodiment shown in FIG. 12A, the service type and the data transmission attribute that are corresponding to the RRC connection request are sent together with the RRC connection request message. In another optional embodiment, the terminal device may alternatively send only the service type corresponding to the RRC connection request together with the RRC connection message request, and send the data transmission attribute corresponding to the RRC connection request before sending the RRC connection message request. In this case, step 1201 and step 1204 may be alternatively implemented as the following steps, as shown in FIG. 12B.

Step 1210: An MME sends an overload start message to an access network device when load is greater than a preset condition, where the overload start message indicates a barred service type and a barred data transmission attribute and/or an allowed service type and an allowed data transmission attribute to the access network device.

Step 1211: The access network device receives the overload start message sent by the MME.

Step 1212: A terminal device sends a data transmission attribute corresponding to an RRC connection request to the access network device.

Step 1213: The access network receives the data transmission attribute that is corresponding to the RRC connection request and that is sent by the terminal device.

Optionally, the access network device sends a correspondence between a random access preamble and a data transmission attribute to the terminal device in advance. The terminal device selects, based on the data transmission attribute corresponding to the RRC connection request, a preamble corresponding to the data transmission attribute to send a random access request to the access network device. The access network device determines, based on the preamble used by the random access request sent by the terminal device, the data transmission attribute corresponding to the RRC connection request.

For example, when the data transmission attribute includes a transmission scheme type: a CP scheme or a UP scheme, the access network device pre-notifies the terminal device that a preamble A is corresponding to the CP scheme and a preamble B is corresponding to the UP scheme. If a service that triggers the terminal device to initiate the RRC connection request uses the CP scheme, the terminal device selects the preamble A to initiate a random access request to the access network device. The access network device receives the random access request, and determines, based on the preamble A used by the random access request, that the data transmission attribute corresponding to the RRC connection request of the terminal device is the CP scheme.

For another example, when the data transmission attribute includes a radio access technology: the WB-E-UTRAN or the NB-IoT, the access network device pre-notifies the terminal device that a preamble C is corresponding to the WB-E-UTRAN and a preamble D is corresponding to the NB-IoT. If a service that triggers the terminal device to initiate the RRC connection request uses the NB-IoT, the terminal device selects the preamble D to initiate a random access request to the access network device. The access network device receives the random access request, and determines, based on the preamble D used by the random access request, that the data transmission attribute corresponding to the RRC connection request of the terminal device is the NB-IoT.

Step 1214: The terminal device sends the RRC connection request message to the access network device, where the RRC connection request has a corresponding service type and a corresponding data transmission attribute.

The RRC connection request message further includes a service type field.

The service type field indicates a service type. Content of the service type field is the same as that in the foregoing example embodiment. Details are not described again in this embodiment.

Step 1215: The access network device receives the RRC connection request message sent by the terminal device.

In view of the above, according to the radio access control method provided in this embodiment of this disclosure, the MME whose load is relatively heavy instructs to bar and/or allow access of some services meeting the data transmission attribute in a type of service, instead of all services in this type of service. This resolves a problem of low MME resource utilization caused because the MME whose load is relatively heavy instructs the access network device to bar access of all services of a type, and achieves the following effect: the access network device may bar and/or allow, based on the instruction of the MME, only access of a service that meets both the service type and the data transmission attribute, and service capabilities are provided for as many service types as possible without significantly increasing the load of the MME, thereby improving network resource utilization.

The following are apparatus embodiments of the present disclosure, and the apparatus embodiments may be used to execute the method embodiments of the present disclosure. For details not disclosed in the apparatus embodiments of the present disclosure, refer to the method embodiments.

Figure 13A:
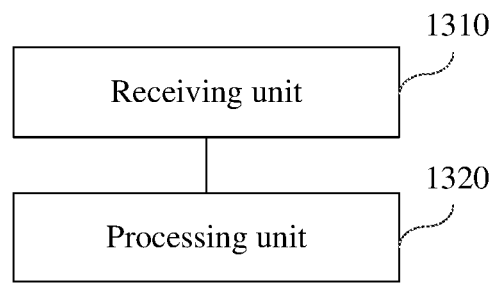
FIG. 13A is a block diagram of a radio access control apparatus according to an example embodiment.

Referring to FIG. 13A, FIG. 13A is a structural block diagram of a radio access control apparatus according to an embodiment of the present disclosure. The radio access control apparatus may be implemented as a part or all of a terminal device by using software, hardware, or a combination of the software and the hardware. The radio access control apparatus may include:

a receiving unit 1310 configured to receive access control information sent by an access network device, where the access control information indicates a barred service type and a barred data transmission attribute and/or an allowed service type and an allowed data transmission attribute to the terminal device, the data transmission attribute includes a transmission scheme type and/or a RAT type, the transmission scheme type indicates a transmission scheme used by the terminal device for transmitting service data, and the RAT type indicates a radio access technology used by the terminal device; and a processing unit 1320 configured to determine, based on the service type and the data transmission attribute, whether to send an RRC connection request to the access network device.

For related details, refer to the foregoing method embodiment.

In another optional embodiment, the access control information includes an access control factor and an access control time period.

The processing unit 1320 is further configured to generate a random number when a service type of a current service meets the barred service type and a data transmission attribute corresponding to the current service meets the barred data transmission attribute.

The processing unit 1320 is further configured to determine whether the random number is less than the access control factor included in the access control information.

The processing unit 1320 is further configured to: when the random number is less than the access control factor, determine to send the RRC connection request to the access network device by using a communications unit.

The processing unit 1320 is further configured to: when the random number is greater than or equal to the access control factor, set a timer based on the access control time period included in the access control information, and when the timer expires, re-execute the step of generating a random number.

For related details, refer to the foregoing method embodiment.

In another optional embodiment, the radio access control apparatus shown in FIG. 13A further includes a sending unit 1330, and the access control information includes an access barring class.

The processing unit 1320 is further configured to: when a service type of a current service meets the barred service type and a data transmission attribute corresponding to the current service meets the barred data transmission attribute, detect whether an access class of the terminal device is equal to the access barring class included in the access control information; and if the access class of the terminal device is not equal to the access barring class, determine to send the RRC connection request to the access network device by using the sending unit 1330; or the processing unit 1320 is further configured to: when a service type of a current service meets the barred service type and a data transmission attribute corresponding to the current service meets the barred data transmission attribute, detect whether an access class of the terminal device is greater than the access barring class included in the access control information; and if the access class of the terminal device is less than the access barring class, determine to send the RRC connection request to the access network device by using the sending unit 1330; or the processing unit 1320 is further configured to: when a service type of a current service meets the barred service type and a data transmission attribute corresponding to the current service meets the barred data transmission attribute, detect whether an access class of the terminal device is less than the access barring class included in the access control information; and if the access class of the terminal device is greater than the access barring class, determine to send the RRC connection request to the access network device by using the sending unit 1330.

For related details, refer to the foregoing method embodiment.

In another optional embodiment, the radio access control apparatus shown in FIG. 13A further includes a sending unit 1330. The determining unit 1320 is further configured to: when a service type of a current service meets the barred service type and a data transmission attribute corresponding to the current service meets the allowed data transmission attribute, send the RRC connection request to the access network device by using the sending unit 1330.

For related details, refer to the foregoing method embodiment.

Figure 13B:
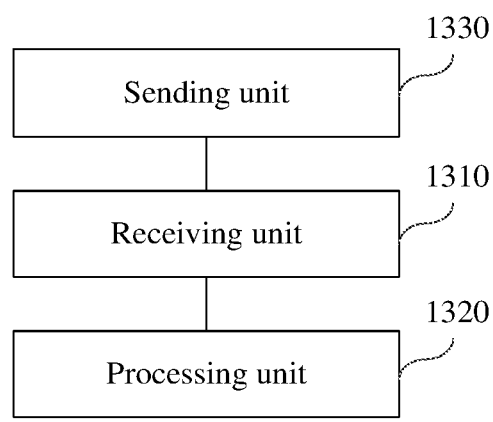
FIG. 13B is a block diagram of a radio access control apparatus according to an example embodiment.

In another optional embodiment, as shown in FIG. 13B, the radio access control apparatus shown in FIG. 13A further includes a sending unit 1330.

The sending unit 1330 is further configured to send the RRC connection request message to the access network device, where the RRC connection request has a corresponding service type and a corresponding data transmission attribute.

The receiving unit 1310 is further configured to receive an RRC connection setup message or an RRC connection reject message sent by the access network device, where the RRC connection setup message or the RRC connection reject message is sent by the access network device based on whether the service type and the data transmission attribute that are corresponding to the RRC connection request belong to the barred service type and the barred data transmission attribute and/or the allowed service type and the allowed data transmission attribute.

The receiving unit 1310 is further configured to send the data transmission attribute corresponding to the RRC connection request to the access network device.

It should be noted that the radio access control apparatus shown in FIG. 13A and/or the radio access control apparatus shown in FIG. 13B are/is configured to implement the radio access control method. The terminal device may receive information by using the receiving unit, the terminal device may send information by using the sending unit, and the terminal device may execute, by using the processing unit, a step of determining whether to send and/or receive information.

An entity apparatus corresponding to the receiving unit is a receiver of the terminal device, an entity apparatus corresponding to the sending unit is a transmitter of the terminal device, and an entity apparatus corresponding to the processing unit is a processor of the terminal device.

Figure 14:
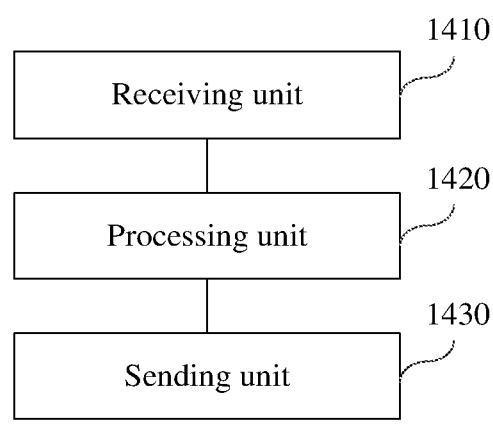
FIG. 14 is a block diagram of a radio access control apparatus according to another example embodiment.

Referring to FIG. 14, FIG. 14 is a structural block diagram of a radio access control apparatus according to an embodiment of the present disclosure. The radio access control apparatus may be implemented as a part or all of an access network device by using software, hardware, or a combination of the software and the hardware. The radio access control apparatus may include:

a receiving unit 1410 configured to receive an overload start message sent by a mobility management entity MME, where the overload start message indicates a barred service type and a barred data transmission attribute and/or an allowed service type and an allowed data transmission attribute to the access network device, the data transmission attribute includes a transmission scheme type and/or a RAT type, the transmission scheme type indicates a transmission scheme used by the terminal device for transmitting service data, and the RAT type indicates a radio access technology used by the terminal device;

a processing unit 1420 configured to generate access control information based on the overload start message received by the receiving unit 1410, where the access control information indicates the barred service type and the barred data transmission attribute and/or the allowed service type and the allowed data transmission attribute to the terminal device; and a sending unit 1430 configured to send the access control information to the terminal device.

For related details, refer to the foregoing method embodiment.

In an optional embodiment, the receiving unit 1410 is further configured to receive an RRC connection request message sent by the terminal device, where the RRC connection request has a corresponding service type and a corresponding data transmission attribute.

The sending unit 1430 is further configured to send an RRC connection setup message or an RRC connection reject message to the terminal device based on whether the service type and the data transmission attribute that are corresponding to the RRC connection request belong to the barred service type and the barred data transmission attribute and/or the allowed service type and the allowed data transmission attribute.

The receiving unit 1410 is further configured to receive the data transmission attribute that is corresponding to the RRC connection request and that is sent by the terminal device.

It should be noted that the radio access control apparatus shown in FIG. 14 is configured to implement the radio access control method. The access network device may receive information by using the receiving unit, the access network device can send information by using the sending unit, and the access network device may execute, by using the processing unit, a step of processing information.

An entity apparatus corresponding to the receiving unit is a receiver of the access network device, an entity apparatus corresponding to the sending unit is a transmitter of the access network device, and an entity apparatus corresponding to the processing unit is a processor of the access network device.

Figure 15:
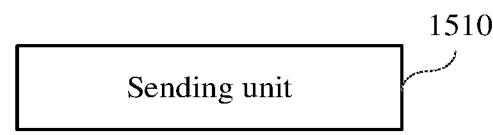
FIG. 15 is a block diagram of a radio access control apparatus according to another example embodiment.

Referring to FIG. 15, FIG. 15 is a structural block diagram of a radio access control apparatus according to an embodiment of the present disclosure. The radio access control apparatus may be implemented as a part or all of an MME by using software, hardware, or a combination of the software and the hardware. The radio access control apparatus may include:

a sending unit 1510 configured to send an overload start message to an access network device when load is greater than a preset condition, where the overload start message indicates a barred service type and a barred data transmission attribute and/or an allowed service type and an allowed data transmission attribute to the access network device, the data transmission attribute includes a transmission scheme type and/or a RAT type, the transmission scheme type indicates a transmission scheme used by a terminal device for transmitting service data, and the RAT type indicates a radio access technology used by the terminal device.

For related details, refer to the foregoing method embodiment.

It should be noted that the radio access control apparatus shown in FIG. 15 is configured to implement the radio access control method. The MME may send information by using the sending unit. The radio access control apparatus shown in FIG. 15 may further include a receiving unit and a processing unit. The MME may receive information by using the receiving unit, and the MME may execute, by using the processing unit, a step of processing information.

An entity apparatus corresponding to the receiving unit is a receiver of the MME, an entity apparatus corresponding to the sending unit is a transmitter of the MME, and an entity apparatus corresponding to the processing unit is a processor of the MME.

It should be noted that, when the radio access control apparatus provided in the embodiment controls radio access, division of the function modules are merely used as an example for description. In actual application, the functions may be allocated to different function modules and implemented as required. In other words, an internal structure of the apparatus is divided into different function modules to implement all or some functions described above. In addition, the radio access control apparatus provided in the embodiment pertains to a same concept as the method embodiment of the radio access control method. For an implementation process of the radio access control apparatus, refer to the method embodiment. Details are not described herein again.

It should be understood that the singular form "one" ("a", "an", or "the") used in this specification is intended to further include a plural form unless the context clearly supports an exception. It should be further understood that "and/or" used in this specification means to include any or all combinations of one or more associated listed items.

The sequence numbers of the embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A radio access control method, wherein the method comprises:
   receiving information from an access network device, the information indicating a barred mobile originated signaling service and a barred control plane scheme to a terminal device; and
   determining, based on the barred mobile originated signaling service and the barred control plane scheme, whether to send a radio resource control connection request to the access network device;
   the barred control plane scheme indicating a transmission scheme used by the terminal device for transmitting service data.

2. The method according to claim 1, wherein:
   the information comprises an action type field, a service type field, and a data transmission attribute field, the service type field comprises the barred mobile originated signaling service, and the data transmission attribute field comprises the barred control plane scheme.

3. The method according to claim 2, wherein:
   the action type field comprises an access barred action type.

4. The method according to claim 1, wherein:
   the information is generated based on an overload start message, the overload start message indicating the barred mobile originated signaling service and the barred control plane scheme.

5. A radio access control method, wherein the method comprises:
   receiving an overload start message from a mobility management entity, the overload start message indicating a barred mobile originated signaling service and a barred control plane scheme to an access network device;
   generating information based on the overload start message, the information indicating the barred mobile originated signaling service and the barred control plane scheme to a terminal device; and
   sending the information to the terminal device;
   the barred control plane scheme indicating a transmission scheme used by the terminal device for transmitting service data.

6. The method according to claim 5, wherein:
   the overload start message comprises an action type field, a service type field, and a data transmission attribute field, the service type field comprises the barred mobile originated signaling service, and the data transmission attribute field comprises the barred control plane scheme.

7. The method according to claim 6, wherein:
   the action type field comprises an access barred action type.

8. The method according to claim 5, the method further comprising:
   parsing the radio resource control connection request message to determine the service type and the data transmission attribute.

9. A radio access control apparatus, the apparatus comprising:
   a memory storing instructions; and
   at least one processor in communication with the memory, the at least one processor configured, upon execution of the instructions, to perform the following steps:
   receive information from an access network device, the information indicating a barred mobile originated signaling service and a barred control plane scheme to the radio access control apparatus; and
   determine, based on the barred mobile originated signaling service and the barred control plane scheme, whether to send a radio resource control connection request to the access network device;
   the barred control plane scheme indicating a transmission scheme used by the radio access control apparatus for transmitting service data.

10. The apparatus according to claim 9, wherein:
    the information comprises an action type field, a service type field, and a data transmission attribute field, the service type field comprises the barred mobile originated signaling service, and the data transmission attribute field comprises the barred control plane scheme.

11. The apparatus according to claim 10, wherein:
    the action type field comprises an access barred action type.

12. The apparatus according to claim 9, wherein:
    the information is generated based on an overload start message, and the overload start message indicates the barred mobile originated signaling service and the barred control plane scheme.

13. An access network device, the apparatus comprising:
a memory storing instructions; and
at least one processor in communication with the memory, the at least one processor configured, upon execution of the instructions, to perform the following steps:
receive an overload start message from a mobility management entity, the overload start message indicating a barred mobile originated signaling service and a barred control plane scheme to the access network device;
generate information based on the overload start message, wherein the information indicates the barred mobile originated signaling service and the barred control plane scheme to a terminal device; and
send the information to the terminal device;
the barred control plane scheme indicating a transmission scheme used by the terminal device for transmitting service data.

14. The apparatus according to claim 13, wherein:
the overload start message comprises an action type field, a service type field, and a data transmission attribute field, the service type field comprises the barred mobile originated signaling service, and the data transmission attribute field comprises the barred control plane scheme.

15. The apparatus according to claim 14, wherein:
the action type field comprises an access barred action type.

16. The apparatus according to claim 13, wherein:
the at least one processor is further configured, upon execution of the instructions, to:
parse the radio resource control connection request message to determine the service type and the data transmission attribute.

* * * * *